(12) United States Patent
Ross

(10) Patent No.: US 12,073,019 B2
(45) Date of Patent: *Aug. 27, 2024

(54) CLENCH-CONTROL ACCESSORY FOR HEAD-WORN DEVICES

(71) Applicant: Hourglass Medical LLC, Monticello, IL (US)

(72) Inventor: Jeremy B. Ross, Monticello, IL (US)

(73) Assignee: Hourglass Medical LLC, Monticello, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,916

(22) Filed: May 11, 2023

(65) Prior Publication Data

US 2023/0280825 A1 Sep. 7, 2023

Related U.S. Application Data

(63) Continuation of application No. 17/648,221, filed on Jan. 18, 2022, now Pat. No. 11,698,678.
(Continued)

(51) Int. Cl.
*G06F 3/01* (2006.01)
*G02B 27/01* (2006.01)

(52) U.S. Cl.
CPC ......... *G06F 3/013* (2013.01); *G02B 27/0176* (2013.01); *G02B 2027/014* (2013.01); *G02B 2027/0178* (2013.01)

(58) Field of Classification Search
CPC ............... G06F 3/013; G02B 27/0176; G02B 2027/014; G02B 2027/017
See application file for complete search history.

(56) References Cited

U.S. PATENT DOCUMENTS

| 3,227,836 A | 1/1966 | Renwick, Sr. |
| 4,920,466 A | 4/1990 | Liu |

(Continued)

FOREIGN PATENT DOCUMENTS

| CA | 2268980 A1 | 4/1998 |
| CN | 208338996 U | 1/2019 |

(Continued)

OTHER PUBLICATIONS

Gu, WeiPing, et al. "Efficacy of biofeedback therapy via a mini wireless device on sleep bruxism contrasted with occlusal splint: a pilot study." Journal of Biomedical Research 29.2 (2015): 160. (Year: 2015).*

(Continued)

*Primary Examiner* — Xin Sheng
(74) *Attorney, Agent, or Firm* — Ascenda Law Group, PC

(57) ABSTRACT

Systems and methods for operating a controlled device via an activation accessory of a wearable device that includes a moveable actuator, a sensor, and a communication element. The sensor is coupled to a controller, which has an output coupled to a control signal interface. The controller is programmed to receive and evaluate input signals from the sensor that are responsive to movements of the moveable actuator to determine whether or not they represent a command for the controlled device by assessing the input signals for a signal pattern indicative of a plurality of volitional actions of a wearer of the activation accessory. If/when the processor determines that the input signals represent the command, then it decodes the command and transmits an associated control signal to the controlled device via the control signal interface.

10 Claims, 8 Drawing Sheets

Related U.S. Application Data

(60) Provisional application No. 63/260,499, filed on Aug. 23, 2021, provisional application No. 63/200,086, filed on Feb. 12, 2021.

(56) References Cited

U.S. PATENT DOCUMENTS

| | | |
|---|---|---|
| 4,970,589 A | 11/1990 | Hanson et al. |
| 5,083,246 A | 1/1992 | Lambert |
| 5,226,712 A | 7/1993 | Luca |
| 5,946,071 A | 8/1999 | Feldman |
| 5,951,141 A | 9/1999 | Bradley |
| 6,016,160 A | 1/2000 | Coombs et al. |
| 6,046,712 A | 4/2000 | Beller et al. |
| 6,126,294 A | 10/2000 | Koyama et al. |
| 6,560,029 B1 | 5/2003 | Dobbie et al. |
| 6,612,695 B2 | 9/2003 | Waters |
| 6,896,389 B1 | 5/2005 | Paul |
| 7,184,903 B1 | 2/2007 | Williams et al. |
| 7,303,303 B1 | 12/2007 | Haynes |
| 7,580,028 B2 | 8/2009 | Jeong et al. |
| 7,814,903 B2 | 10/2010 | Osborne et al. |
| 8,188,937 B1 | 5/2012 | Amafuji et al. |
| 8,337,014 B2 | 12/2012 | Kokonaski et al. |
| 8,587,514 B2 | 11/2013 | Lundstrom |
| 8,708,483 B2 | 4/2014 | Kokonaski et al. |
| 9,013,264 B2 | 4/2015 | Parshionikar et al. |
| 9,285,609 B1 | 3/2016 | Rost |
| 9,632,318 B2 | 4/2017 | Goto et al. |
| 10,477,298 B2 | 11/2019 | Cruz-Hernandez |
| 10,736,560 B2 | 8/2020 | Haugland et al. |
| 2002/0027777 A1 | 3/2002 | Takasu |
| 2002/0122014 A1 | 9/2002 | Rajasingham |
| 2003/0202341 A1 | 10/2003 | McClanahan |
| 2004/0008158 A1 | 1/2004 | Chi et al. |
| 2004/0136178 A1 | 7/2004 | Yu |
| 2004/0189930 A1 | 9/2004 | Skuro |
| 2004/0252487 A1 | 12/2004 | McCullough et al. |
| 2005/0102133 A1 | 5/2005 | Rees |
| 2005/0105285 A1 | 5/2005 | Maden |
| 2005/0226433 A1 | 10/2005 | McClanahan |
| 2006/0048286 A1 | 3/2006 | Donato |
| 2006/0061544 A1 | 3/2006 | Min et al. |
| 2006/0119539 A1 | 6/2006 | Kato et al. |
| 2006/0238878 A1 | 10/2006 | Miyake et al. |
| 2007/0243835 A1 | 10/2007 | Zhu et al. |
| 2007/0277819 A1 | 12/2007 | Osborne et al. |
| 2008/0216215 A1 | 9/2008 | Lee |
| 2009/0073082 A1 | 3/2009 | Yoshikawa |
| 2009/0187124 A1 | 7/2009 | Ludlow et al. |
| 2009/0251661 A1 | 10/2009 | Fuziak, Jr. |
| 2009/0267805 A1 | 10/2009 | Jin et al. |
| 2010/0014699 A1 | 1/2010 | Anderson et al. |
| 2010/0081895 A1 | 4/2010 | Zand |
| 2010/0177277 A1 | 7/2010 | Kokonaski et al. |
| 2010/0250231 A1 | 9/2010 | Almagro |
| 2010/0271588 A1 | 10/2010 | Kokonaski et al. |
| 2010/0283412 A1 | 11/2010 | Baudou |
| 2010/0327028 A1 | 12/2010 | Nakabayashi et al. |
| 2011/0089207 A1 | 4/2011 | Tricoukes et al. |
| 2011/0221672 A1 | 9/2011 | Osterhout et al. |
| 2011/0288445 A1 | 11/2011 | Lillydahl et al. |
| 2011/0317402 A1 | 12/2011 | Cristoforo |
| 2012/0002046 A1 | 1/2012 | Rapoport et al. |
| 2012/0052469 A1 | 3/2012 | Sobel et al. |
| 2012/0127420 A1 | 5/2012 | Blum et al. |
| 2012/0127423 A1 | 5/2012 | Blum et al. |
| 2012/0206323 A1 | 8/2012 | Osterhout et al. |
| 2012/0229248 A1* | 9/2012 | Parshionikar .......... G08B 21/06 340/3.1 |
| 2012/0242698 A1 | 9/2012 | Haddick et al. |
| 2012/0262667 A1 | 10/2012 | Willey |
| 2012/0287284 A1 | 11/2012 | Jacobsen et al. |
| 2012/0312669 A1 | 12/2012 | Breeds et al. |
| 2013/0016426 A1 | 1/2013 | Chiang |
| 2013/0201439 A1 | 8/2013 | Kokonaski et al. |
| 2013/0278881 A1 | 10/2013 | Kokonaski et al. |
| 2013/0300649 A1 | 11/2013 | Parkinson et al. |
| 2013/0329183 A1 | 12/2013 | Blum et al. |
| 2014/0000014 A1 | 1/2014 | Redpath et al. |
| 2014/0028966 A1 | 1/2014 | Blum et al. |
| 2014/0079257 A1 | 3/2014 | Ruwe et al. |
| 2014/0082587 A1 | 4/2014 | Delaney |
| 2014/0160250 A1 | 6/2014 | Pomerantz et al. |
| 2014/0249354 A1 | 9/2014 | Anderson et al. |
| 2014/0259287 A1 | 9/2014 | Waters et al. |
| 2014/0259319 A1 | 9/2014 | Ross et al. |
| 2014/0354397 A1 | 12/2014 | Quintal, Jr. et al. |
| 2015/0094715 A1 | 4/2015 | Laufer et al. |
| 2015/0109769 A1 | 4/2015 | Chang |
| 2016/0054570 A1 | 2/2016 | Bosveld et al. |
| 2016/0178903 A1 | 6/2016 | Nakajima |
| 2016/0216519 A1 | 7/2016 | Park et al. |
| 2016/0255305 A1 | 9/2016 | Ritchey et al. |
| 2016/0313801 A1* | 10/2016 | Wagner ................... G06F 1/163 |
| 2016/0316181 A1 | 10/2016 | Hamra |
| 2017/0075198 A1 | 3/2017 | Kuroki |
| 2017/0215717 A1 | 8/2017 | Orringer et al. |
| 2017/0227780 A1 | 8/2017 | Tatsuta et al. |
| 2017/0257723 A1 | 9/2017 | Morishita et al. |
| 2017/0270820 A1 | 9/2017 | Ashby |
| 2017/0322641 A1 | 11/2017 | Osterhout |
| 2018/0003764 A1 | 1/2018 | Menon et al. |
| 2018/0242908 A1 | 8/2018 | Sazonov et al. |
| 2019/0142349 A1 | 5/2019 | Schorey et al. |
| 2019/0178476 A1 | 6/2019 | Ross |
| 2019/0178477 A1 | 6/2019 | Ross |
| 2019/0265802 A1* | 8/2019 | Parshionikar ........... G06F 3/012 |
| 2020/0059467 A1 | 2/2020 | Chereshnev |
| 2020/0072596 A1 | 3/2020 | Pang et al. |
| 2020/0097084 A1 | 3/2020 | Ross |
| 2020/0249752 A1* | 8/2020 | Parshionikar ........... G06F 1/163 |
| 2020/0285080 A1 | 9/2020 | Belli et al. |
| 2020/0320412 A1 | 10/2020 | Gillian et al. |
| 2021/0029435 A1 | 1/2021 | Siahaan et al. |

FOREIGN PATENT DOCUMENTS

| | | |
|---|---|---|
| DE | 10 2006 015334 A1 | 10/2007 |
| EP | 1 928 296 B1 | 5/2011 |
| FR | 2832906 A1 | 6/2003 |
| JP | 2002268815 A | 9/2002 |
| JP | 2009116609 A | 5/2009 |
| WO | WO 96/37730 A1 | 11/1996 |
| WO | WO 2004/087258 A1 | 10/2004 |
| WO | 2009/133258 A1 | 11/2009 |
| WO | WO 2010/062479 A1 | 6/2010 |
| WO | WO 2014/068371 A1 | 5/2014 |
| WO | WO 2015/124937 A1 | 8/2015 |
| WO | WO 2017/065663 A1 | 4/2017 |
| WO | WO 2020/117597 A1 | 6/2020 |
| WO | WO 2020/248778 A1 | 12/2020 |
| WO | WO 2022/098973 A1 | 5/2022 |

OTHER PUBLICATIONS

Communication pursuant to Article 94(3) EPC dated Apr. 28, 2023, from the European Patent Office, for European Patent Application No. 19827960.6, 7 pgs.

International Preliminary Report on Patentability mailed Aug. 24, 2023, from the International Bureau of WIPO, for International Patent Application No. PCT/US2022/012746 (filed Jan. 18, 2022), 10 pgs.

Etani, Takehito, "The Masticator", The Masticator: the social mastication (2016), downloaded from: http://www.takehitoetani.com/masticator, 5 pages.

Goel, Mayank; et al., "Tongue-in-Cheek: Using Wireless Signals to Enable Non-Intrusive and Flexible Facial Gestures Detection", HMDs & Wearables to Overcome Disabilities, CHI 2015, Apr. 18-23, 2015, Crossings, Seoul, Korea, pp. 255-258.

(56) References Cited

OTHER PUBLICATIONS

Gu; et al. "Efficacy of biofeedback therapy via a mini wireless device on sleep bruxism contrasted with occlusal splint: a pilot study", Journal of Biomedical Research, 2015, 29(2):160-168.

International Preliminary Report on Patentability mailed Mar. 3, 2021, from the IPEA/US, for International Patent Application No. PCT/US2019/063717 (filed Nov. 27, 2019), 6 pgs.

International Preliminary Report on Patentability mailed Aug. 4, 2020, from the IPEA/US, for International Application No. PCT/US2018/062767 (filed Nov. 28, 2018), 18 pgs.

International Preliminary Report on Patentability mailed Jan. 12, 2023, from the International Bureau of WIPO, for International Patent Application No. PCT/US2021/039395 (filed Jun. 28, 2021), 11 pgs.

International Search Report and Written Opinion mailed Mar. 5, 2019, from the ISA/US, for International Application No. PCT/US18/62767 (filed Nov. 28, 2018), 15 pages.

International Search Report and Written Opinion mailed May 13, 2020, from the ISA/European Patent Office, for International Application No. PCT/US2019/063717 (filed Nov. 27, 2019), 16 pgs.

International Search Report and Written Opinion mailed Apr. 20, 2022, from the ISA/European Patent Office, for International Patent Application No. PCT/US2022/012746 (filed Jan. 18, 2022), 15 pgs.

International Search Report and Written Opinion mailed Oct. 20, 2021, from the ISA/European Patent Office, for International Application No. PCT/US2021/039395 (filed Jun. 28, 2021), 14 pgs.

International Search Report and Written Opinion mailed Jan. 25, 2022, from the ISA/European Patent Office, for International Application No. PCT/US2021/058209 (filed Nov. 5, 2021), 15 pgs.

International Search Report and Written Opinion mailed Jul. 26, 2022, from the ISA/European Patent Office, for International Patent Application No. PCT/US2022/025324 (filed Apr. 19, 2022), 13 pgs.

Invitation to Pay Additional Fees and Partial Search mailed Mar. 4, 2020, from the ISA/European Patent Office, for International Patent Application No. PCT/US2019/063717 (filed Nov. 27, 2019), 15 pages.

Khoshnam; et al., "Hands-Free EEG-Based Control of a Computer Interface Based on Online Detection of Clenching of Jaw", International Conference on Bioinformatics and Biomedical Engineering, IWBBIO 2017, Part I, Lecture Notes in Computer Science book series (LNCS, vol. 10208), pp. 497-507.

Knapp, R. Benjamin, "Biosignal Processing in Virtual Reality Applications," Cal. State University Northridge Center on Disabilities Virtual Reality Conference 1993 (1993) (available at http://www.csun.edu/~hfdss006/conf/1993/proceedings/BIOSIG~1.htm).

Tato-Klesa, Hella, "Detection of Teeth Grinding and Clenching using Surface Electromyography", Master's thesis, Jul. 29, 2020, Technische Universität München, Munich, Germany, 72 pgs.

Terndrup, Matthew, "Wiggle your nose to control VR experiences with Reach Bionics," Upload VR (Jan. 12, 2016) (Available at https://uploadvr.com/reach-bionics-lets-you-control-vr-experiences-by-wiggling-your-nose/).

Von Rosenberg; et al., "Smart helmet: Monitoring brain, cardiac and respiratory activity," 2015 37th Annual International Conference of the IEEE Engineering in Medicine and Biology Society (EM BC), Milan, 2015, pp. 1829-1832, NPL001 (Year: 2015).

Xu; et al., "Clench Interaction: Novel Biting Input Techniques", Human Factors in Computing Systems Proceedings (CHI 2019), May 4-9, 2019, 12 pages.

Office Action dated Apr. 24, 2023, for U.S. Appl. No. 18/146,087, (filed Dec. 23, 2022), 11 pgs.

"Detent", Merriam-Webster, definition, downloaded Jan. 23, 2024, from https://www.merriam-webster.com/dictionary/detent, 14 pgs.

International Search Report and Written Opinion mailed Jan. 22, 2024, from the ISA/US, for International Application No. PCT/US23/32656 (filed Sep. 13, 2023), 13 pgs.

* cited by examiner

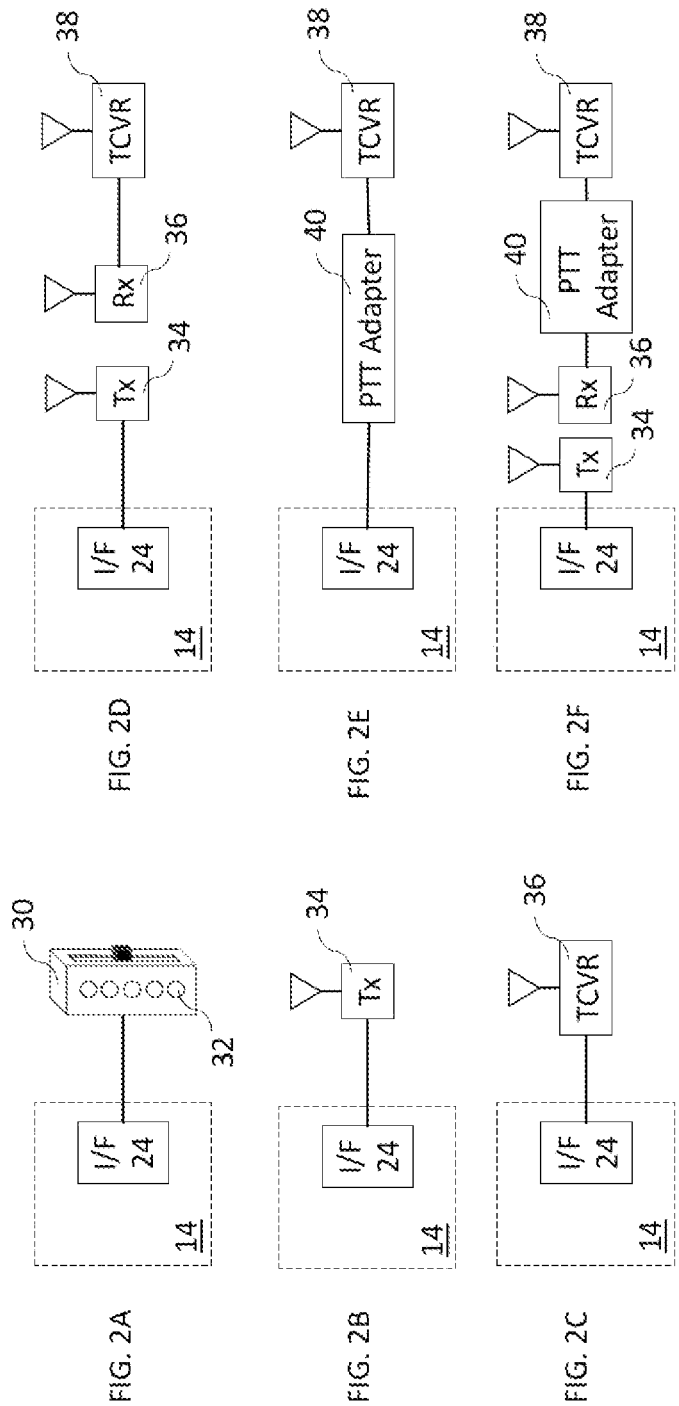

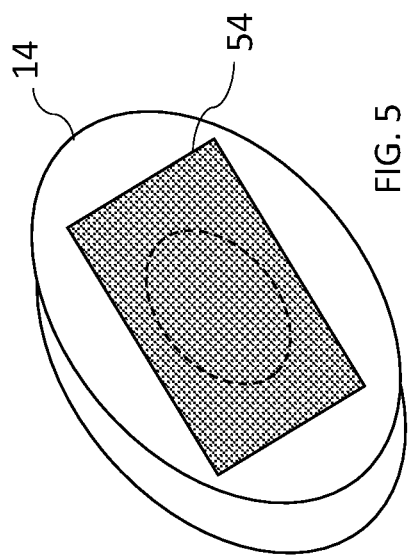
FIG. 5
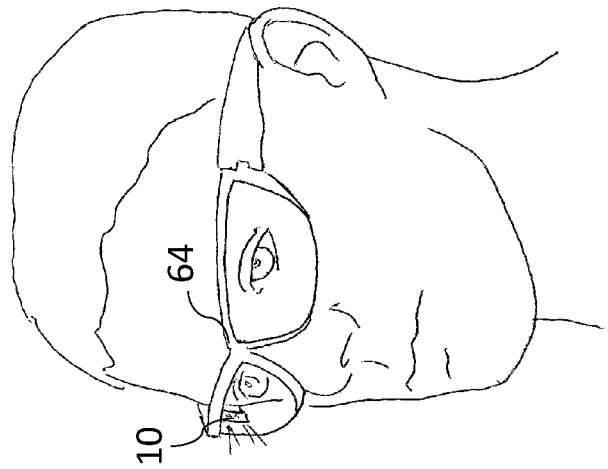
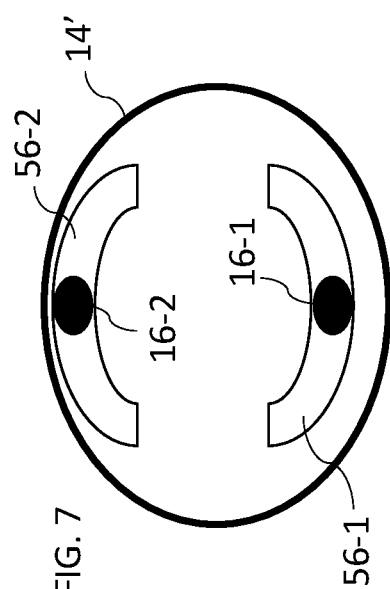
FIG. 7
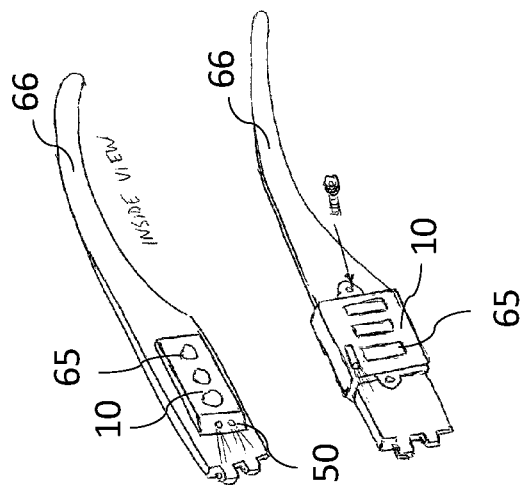
FIG. 6

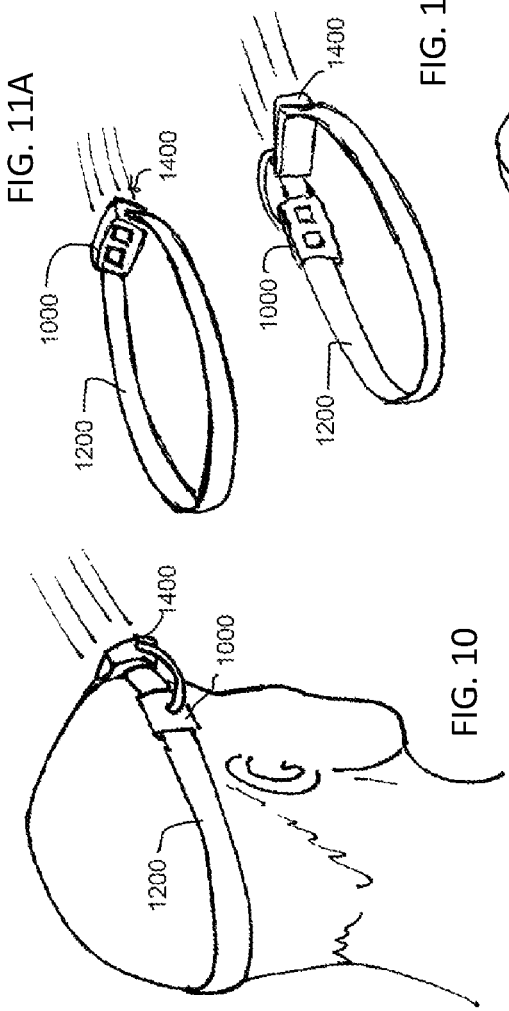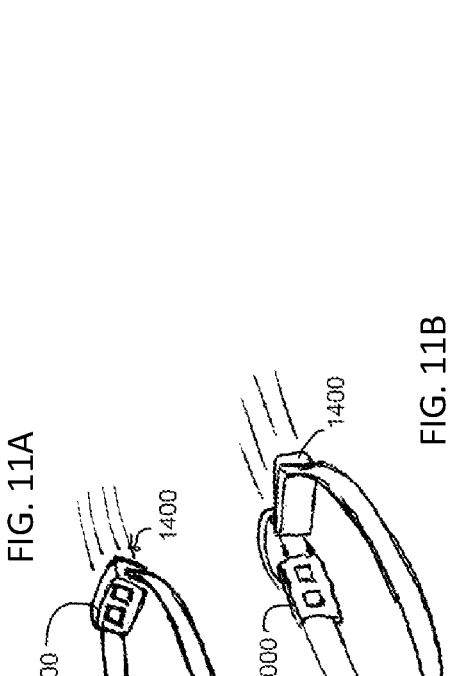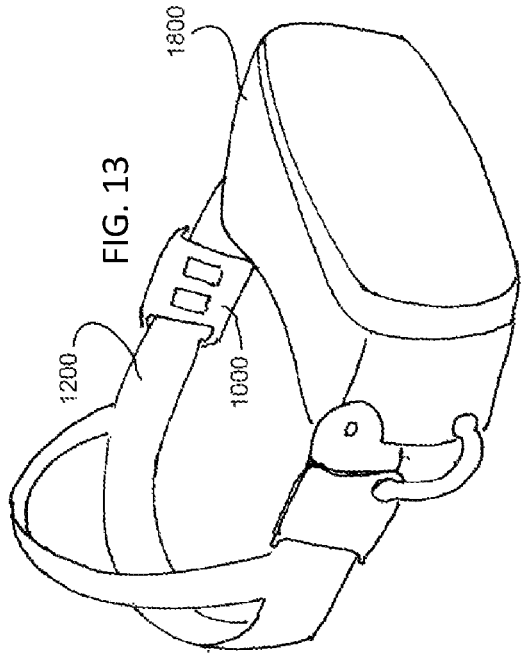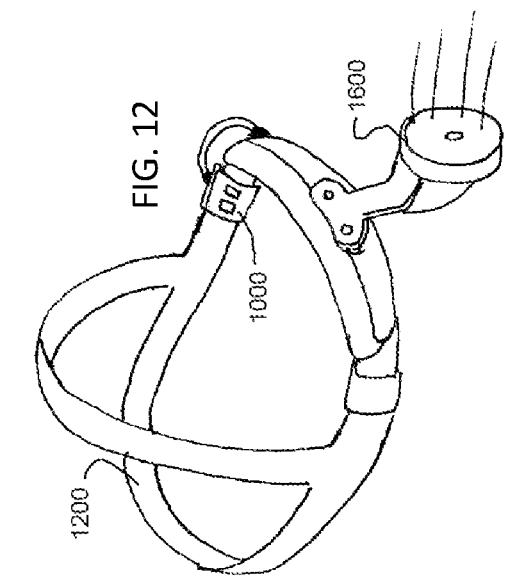

CLENCH-CONTROL ACCESSORY FOR HEAD-WORN DEVICES

RELATED APPLICATIONS

This is a CONTINUATION of U.S. application Ser. No. 17/648,221, filed Jan. 18, 2022, which is a NONPROVISIONAL of, claims priority to, and incorporates by reference U.S. Provisional Application No. 63/200,086, filed 12 Feb. 2021, and 63/260,499, filed 23 Aug. 2021.

FIELD OF THE INVENTION

The present invention relates to systems and methods for operating a controlled device using an accessory mounted to or integral with a head-worn device, such as spectacles, a headset, goggles, or other head-worn apparatus.

BACKGROUND

The desire for hands-free operation of controlled devices arises in many contexts. For example, U.S. Pat. No. 7,184,903 describes a hands-free, mouth-activated switch disposed within a cup-shaped, rigid portion of a pilot's oxygen mask. Among the elements controllable by such a switch is a night vision compatible light. U.S. Patent Application Publication 2012/0229248 describes a hands-free controller that monitors facial expressions of a wearer and other body motions and generates commands for a controlled device based on the combination of the facial expressions and other monitored motions.

Simple head-worn devices such as surgical and outdoor recreational headlamps, and more advanced systems, such as virtual reality headsets, have used input means such as tactile buttons and switches, touch activated control surfaces, and gesturing technologies as means of controlling their operation. All of these input means require a user to use his or her hands to effect input to the device. Advancements in hands-free functionality for such devices have been limited primarily to voice recognition technologies that have limitations when used in noisy or sound-sensitive environments or eye tracking technologies that require the user to gaze at particular objects in order to be detected, which requires "dwell time," increasing input latency.

The use of "clench interactions" has been recognized as a viable control technique. For example, the present applicant's U.S. PGPUB 2020/0097084, Xu et al., "Clench Interaction: Novel Biting Input Techniques," Proc. 2019 CHI Conference on Human Factors in Computing Systems (CHI 2019), May 4-9, 2019, Glasgow, Scotland UK, and Koshnam, E. K. et al., "Hands-Free EEG-Based Control of a Computer Interface based on Online Detection of Clenching of Jaw," in: Rojas I., Ortuño F. (eds) Bioinformatics and Biomedical Engineering, IWBBIO 2017, pp. 497-507 (Apr. 26-28, 2017) all provide examples of such techniques. In Xu et al., the use of bite force interfaces may afford some advantages in some applications, however, the present invention adopts a different approach inasmuch as it relies on sensors placed outside a user's oral cavity. Such sensors are more suitable for applications where the presence of sensors inside one's mouth may be uncomfortable or impractical. In Koshnam et al., the EEG sensors were external to the oral cavity, having been placed at temporal sites T7 and T8 on the wearer's head, but there was no provision for alerting the wearer when a command signal was recognized as having been initiated through a jaw clench action. Accordingly, the system was perceived as having excessive lag time in recognizing and implementing a clench action, which adversely impacted its use as a control element for a remote device.

SUMMARY OF THE INVENTION

In one embodiment, the present invention provides a system for operating a controlled device that includes a module having a sensor and a moveable actuator, the sensor being configured to produce output signals according to a relative position of the actuator (e.g., the actuator itself or the relative position of the actuator to the sensor) to the sensor, and the module adapted to be worn on a person of a wearer by attachment to a headband of an augmented reality (AR) or virtual reality (VR) headset or a temple piece of a pair of spectacles. The moveable actuator may be configured to be displaceable relative to the sensor in a first plane different from a second plane defined by a width of the headband of an AR or VR headset or the temple piece of the pair of spectacles, as applicable. For example, If the headband or temple piece, as applicable, has a width in a vertical plane, the moveable actuator may be configured to be displaceable relative to the sensor in a plane approximately horizontal (i.e., approximately orthogonal to the second plane). By approximately, deviations of up to 5 degrees, or up to ten degrees from orthogonal are contemplated. Alternatively, or in addition, the moveable actuator may be configured to be displaceable relative to the headband of the AR or VR headset or the temple piece of the pair of spectacles, as applicable.

The system further includes a controller coupled to receive the output signals from the sensor. The controller includes a processor and a memory coupled thereto, with the memory storing processor-executable instructions that, when executed by the processor, cause the processor to receive and evaluate the output signals of the sensor to determine whether or not the output signals of the sensor represent a command for the controlled device by assessing the output signals of the sensor for a signal pattern indicative of one or more volitional actions of the wearer of the module. In various embodiments, the processor-executable instructions cause the processor to evaluate the output signals from the sensor by evaluating the output signals against a stored library of command signal representations, where each command signal representation of the stored library of command signal representations characterizes an associated command for the controlled device; according to power spectral densities output signals from the sensor within specified time periods; according to count values of the sensor received within a specified time period; or against a trained model of command signal representations, where each command signal representation of the model characterizes an associated command for the controlled device. Further, when executed by the processor the processor-executable instructions further cause the processor, when the processor determines that the output signals of the sensor represent the command for the controlled device, to then decode the command for the controlled device and transmit a control signal to the controlled device via a communication element, or, otherwise, if the processor determines that the output signals of the sensor do not represent the command, then not transmit the control signal and proceed to evaluate further output signals of the sensor. And the system includes the communication element communicatively coupled to receive the control signal from the processor and to transmit the control signal to the controlled device. The controlled device may be the AR or VR headset or spectacles on which the module is mounted or a different controlled device. And, the system may also include a vibration motor communicably coupled to receive an activation signal from the processor, wherein the processor-executable instructions, when executed by the processor, further cause the processor to transmit the activation signal when the processor determines that the output signals of the sensor represent the command for the controlled device.

Further embodiments of the invention include systems and methods for operating a controlled device via an activation accessory attached to or integral with a head-worn wearable device. The activation accessory includes a moveable actuator having a range of travel between a fully extended position and fully compressed position, a sensor, and a communication element. The sensor is coupled to a controller, which has an output coupled to a control signal interface. The controller is programmed to receive and evaluate input signals from the sensor that are responsive to movements of the moveable actuator to determine whether or not they represent a command for the controlled device by assessing the input signals for a signal pattern indicative of a plurality of volitional actions (e.g., jaw clenches) of a wearer of the wearable device. If/when the processor determines that the input signals represent the command, then it decodes the command and transmits an associated control signal to the controlled device via the control signal interface.

In one example, the activation accessory includes a Hall effect sensor, and a magnet is positioned on the moveable actuator so that it causes the Hall effect sensor to output signals to the controller due to movements of the moveable actuator. The controller includes a processor and a memory coupled thereto which stores processor-executable instructions that, when executed by the processor, cause the processor to receive and evaluate input signals from the Hall effect sensor. In particular, the controller evaluates the input signals to determine whether or not they represent a command for the controlled device by assessing the input signals for a signal pattern indicative of any of a plurality of such commands. If/when the processor determines that the input signals represent one of the plurality of commands, then it decodes the respective command and transmits an associated control signal to the controlled device via the control signal interface. The controller may also provide feedback to the wearer by providing an activation signal to a vibration motor. On the other hand, if the processor determines that the input signals from the sensor do not represent a command, no control signal or activation signal is transmitted and the processor proceeds to evaluate further/new input signals from the Hall effect sensor in a like manner as the original input signals.

A communication element, which may be a part of the activation accessory or otherwise included/integrated in the wearable device, is coupled to the control signal interface and is adapted to transmit the control signal from the processor to the controlled device. For example, the communication element may be a cable having a plug configured to mate with a jack at the controlled device, or a transmitter adapted for radio frequency communication with a receiver at the controlled device.

In various embodiments, the moveable actuator may be supported in or by a mount on the wearable device, such as a temple piece or the frame of eyewear (e.g., glasses, goggles, AR/VR headset, etc.), a headset, or another arrangement. For example, the moveable actuator may be moveable with respect to a temple piece or frame of the eyewear, or a frame of a headset, so as to permit operation of the activation accessory at different positions on the wearer. In one example, the moveable actuator of the actuation accessory may be positioned on the moveable device so that when the moveable device is being worn the moveable actuator touches the skin of the wearer overlying an area of the wearer's temporalis muscle, or the tendon which inserts onto the coronoid process of the mandible, or masseter muscle. The temporalis muscle and masseter muscle can generally be felt contracting while the jaw is clenching and unclenching, and it is such clench actions which, by virtue of the resulting movement of the moveable actuator, can cause the sensor to output signals to the controller.

In some cases, the moveable actuator of the activation accessory may be supported in a helmet or mask (e.g., a helmet or mask used by a firefighter, a diver, an aircrew member, or another wearer), where the mask is configured to position the moveable actuator so as to be overlying an area of the wearer's temporalis or masseter muscle. Alternatively, the entire activation accessory may be included in a module having an adhesive applied to a surface thereof to enable a module encasing the activation accessory to be worn directly on the face or head of the wearer. Such an adhesive may, in one case, be in the form of a removeable film adhered to the surface of the module that encloses the activation accessory.

The activation accessory may include more than one Hall effect sensor, and/or sensors of different types, with the multiple sensors arranged with respect to one another so as to permit individual and/or group activation thereof by associated volitional jaw clench (or other muscle activity) actions of the wearer. Further, in addition to a vibrational motor, a visual activation indicator may be present. Such a visual activation indicator (e.g., an LED) may be coupled to receive a visual activation indication signal from the controller and the processor-executable instructions, when executed by the processor, may further cause the processor to perform transmit the visual activation indication signal to the visual activation indicator if/when the processor determines that input signals from one or more of the sensors represent a command for the controlled device.

When assessing the input signals from a Hall effect sensor or other sensor for the signal pattern indicative of a command for the controlled device, the processor may evaluate the input signals against a stored library of command signal representations, where each command signal representation characterizes an associated command for the controlled device. Alternatively, or in addition, the input signals may be assessed according to respective power spectral densities thereof within specified time periods. Or the input signals may be assessed according to count values of the Hall effect sensor(s) received within a specified time period. Still further, the input signals may be evaluated against a trained model of command signal representations, where each command signal representation characterizes an associated command for the controlled device.

These and still more embodiments of the invention are described in detail below with reference to the accompanying drawings.

BRIEF DESCRIPTION OF THE DRAWINGS

The present invention is illustrated by way of example, and not limitation, in the figures of the accompanying drawings, in which:

FIGS. 2A-2F illustrate examples of devices operated under the control of an activation accessory configured in accordance with an embodiment of the present invention.

FIG. 5 illustrates an example of an activation accessory having a film of adhesive on one surface for attachment to a wearer in accordance with an embodiment of the present invention.

FIG. 6 illustrates examples of an activation accessory secured in a temple piece of eyewear in accordance with embodiments of the present invention.

FIG. 7 illustrates an example of an activation accessory for a controlled device configured with multiple sensors, in accordance with an embodiment of the present invention.

FIGS. 10-12 illustrate various examples of head-worn accessory module arrangements configured in accordance with embodiments of the present invention and used to control headlamps.

FIG. 13 illustrates an examples of a head-worn accessory module arrangement configured in accordance with embodiments of the present invention and used to control an AR/VR headset.

DETAILED DESCRIPTION

Figure 1:
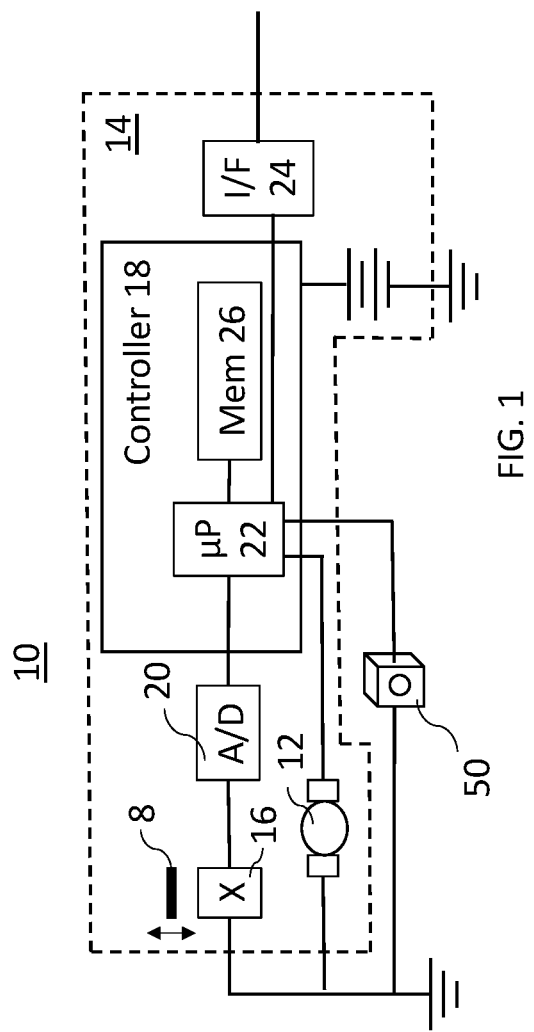
FIG. 1 illustrates an example of an activation accessory for a controlled device configured in accordance with an embodiment of the present invention.
Figure 3A:
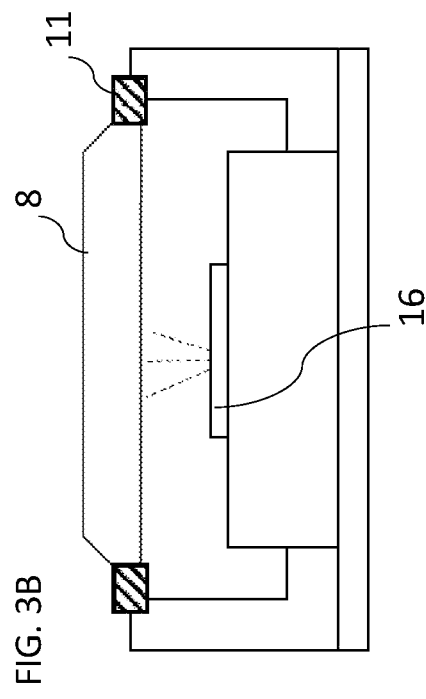
FIGS. 3A-3D illustrate various examples of moveable actuator and sensor arrangements for activation accessories configured in accordance with embodiments of the present invention.
Figure 3B:
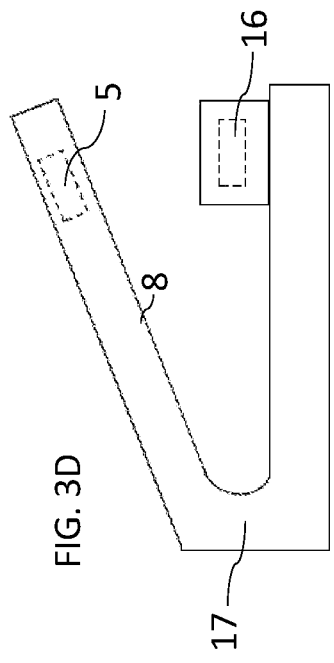
Figure 3C:
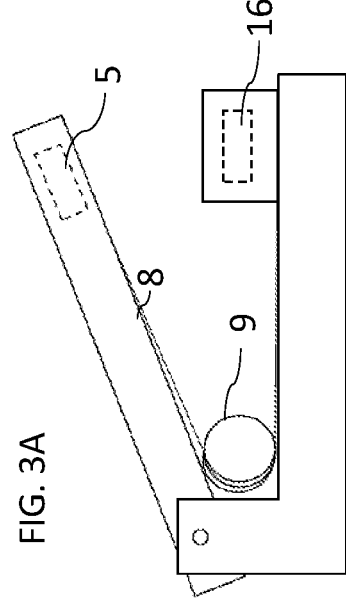
Figure 3D:
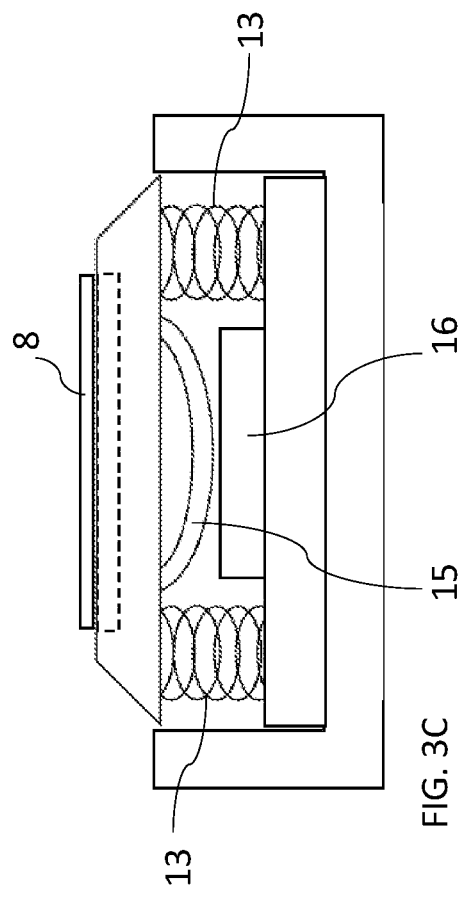

Described herein are systems and methods for switched operation, in many cases hands-free operation, of controlled devices, for example illumination systems, push-to-talk (PTT) systems, computer user interface cursors and other user interface elements, and other devices. In the following description the terms activation accessory, accessory module, wearable module, and wearable electronic controller are used interchangeably to refer to an apparatus having one or more sensors that are responsive to various movements of a wearer, such as clenching of the jaw, as further described below. The apparatus may further have a programmable unit (e.g., a processor, controller, or similar device) that is communicably coupled to the one or more sensors to receive electrical or optical signals provided by the sensors and determine whether or not those signals correspond to commands intended for one or more controlled devices. In other instances, the programmable unit may be a separate unit included or integrated with a wearable device such as spectacles, a headband, a headset, a helmet, or other device. And the apparatus may further have a communication component usable by the programmable unit to relay commands to the one or more controlled devices when the programmable unit determines that one or more signals from the sensors correspond to commands intended for the one or more controlled devices, or, alternatively, the communication component may be included or integrated with the wearable device and may, in some cases, be integral with the programmable unit. Reference to one or some, or various embodiments of the invention or the like, should not be read as excluding the described features and components from other or separately described embodiments of the invention unless otherwise indicated.

One embodiment of the invention, examples of which are illustrated in FIGS. 10-13, is an accessory module 1000 that can be attached to an elastic or other (e.g., rigid) headband 1200 used to secure a headlamp, e.g., a recreational headlamp 1400 or surgical headlamp 1600, or virtual reality (VR) or augmented reality (AR) headset 1800 to a user's head. In other embodiments, the module may be attached to a temple piece of a pair of spectacles (e.g., AR/VR spectacles or regular spectacles). As explained in greater detail below the module 1000 includes, among other things, a sensor and a moveable actuator, the sensor being configured to produce output signals according to a relative position of the actuator (e.g., according to a relative position of the actuator itself or according to a relative position of the actuator to the sensor). The moveable actuator may be configured to be displaceable relative to the sensor in a first plane different from a second plane defined by a width of the headband of an AR or VR headset or the temple piece of the pair of spectacles, as applicable. For example, If the headband or temple piece, as applicable, has a width in an approximately vertical plane (when worn by the wearer), the moveable actuator may be configured to be displaceable relative to the sensor in an approximately horizontal plane (i.e., a first plane approximately orthogonal to the second plane). By approximately, deviations of up to 5 degrees, or up to ten degrees from orthogonal are contemplated. Another way of envisioning this is that if one considers the second plane the be approximately parallel to a portion of the wearer's head in a location proximate to the module when worn by the wearer, then the first plane may be approximately parallel to the floor or ground on which the wearer is standing. By having the approximately orthogonal relationship of the plane of movement of the moveable actuator and the plane of the width of the headband or temple piece, the usability of the module is improved over that which it might otherwise be as the expected range of motion through which the actuator can be expected to travel will be at its greatest extent. This will help in detecting volitional movements of the wearer that are intended as command inputs for the controlled device. Preferably, the module mounts on an interior of the headband of the AR or VR headset or the temple piece of the pair of spectacles, as applicable, so as to be adjacent the wearer's skin when worn on the person of the wearer. That is, the module mounts so that the moveable actuator is adjacent the wearer's skin when worn on the person of the wearer. In some cases, portions of the module may be on the outside of the headband or temple piece or the module may be arranged so that is forms an integral part of the headband or temple piece, as applicable. Alternatively or in addition, the moveable actuator may be configured to be displaceable relative to the headband of the AR or VR headset or the temple piece of the pair of spectacles, as applicable.

In some embodiments, the module 1000 can be moved along the headband 1200 (or temple piece, as applicable) to contact the wearer's temple or moved to another more suitable and clench-detectible area when the device is worn. From this position on the user, sensors (e.g., EMG and/or Hall Effect sensors) included in module 1000 can be tuned to detect certain facial movements such as clenching of the jaw, which movement is then converted into an electrical signal that is sent to a control unit to be processed. Once processed and determined to be a command signal, certain functions are enabled such as activating and deactivating and changing the brightness of a light emitting diode (LED) in the case of a headlamp or controlling a host of system functions in the case of a virtual reality headset. When combined or integrated with gyroscopic and accelerometer sensors, eye tracking sensors, or other movement sensing technologies in the virtual environment, hands-free control capabilities analogous to the "point and click" operations facilitated by a peripheral mouse, trackpad, or joystick connected to a personal computer can be achieved (e.g., different numbers of activations similar to single-, double- or other mouse clicks, cursor movements, etc.). Different command activation sequences may be used for zooming a camera, panning a direction in a virtual/visual environment, or a host of other commands to control cameras, audio transmissions (volume up or down), etc.

Additional and/or other functions for such devices may also be controlled, such as changing the volume of audio communications or music, activating push-to-talk feature on a radio, or answering a phone call. A distinct "clench language" may be programmed to control certain functions using specific clench sequences or patterns.

Additional sensors such as for wearer vital signs monitoring may also be integrated into the module to provide remote biomonitoring of the wearer, as the temple area has been proven to be an effective location for sensing certain vital signs.

The accessory module may be integrated into headbands, permanently attached as an accessory, or adjustably attached using adhesive tape, glue, magnets, hook and loop fasteners, screws, or a tongue and groove or dovetail profile connection mechanism. A buckle design could also be used, allowing the module to be repositioned by sliding it forward or backwards along the strap.

The accessory module may be placed onto a helmet retention head strap (e.g., those found in a construction hard hat or combat helmet) for remotely controlling devices that are attached to the helmet or located elsewhere.

The sensor signal may be routed through a powered cable/tether or via a wireless connection such as Bluetooth™ or Near Field Magnetic Induction. This may wirelessly connect the accessory module to controlled devices such as headlamps and virtual reality headsets.

The accessory module may also provide haptic feedback to the user as notification of the status of controlled systems or to signal the detection of clench inputs.

One or more of the above-described embodiments may include provision of a redundant control button on the accessory module or located in another location on the device that allows the user to bypass clench or other facial movement actuation and control each device using a finger.

One or more of the above-described embodiments may permit signal generation via a control surface that can be activated by direct or indirect force, hinged paddle, touch-sensitive surface, or other tactile actuation device. Devices configured in accordance with these embodiments may employ moveable structures (e.g., hinged frame pieces, paddles or other actuators) that house Hall Effect sensors to detect a change in an electromagnetic field when a corresponding magnet is moved in proximity to a sensor. Such devices may be in the form of an accessory or fully integrated into a wearable form factor such as headlamps and virtual reality headsets.

By providing a single sensing module or left-side and right-side modules (or any number of them arranged at various locations on the user) a more accurate detection of clenching or specific facial movements may be achieved. A calibration mode may also be provided to best tailor the detection envelope of the sensor specifically for an individual user.

Embodiments of the invention include systems and methods for operating a controlled device, such as an illumination element having one or more LEDs, an augmented reality (AR) or virtual reality (VR) headset or spectacles, a camera or other imaging device, a cursor of a personal computer user interface, a mobile phone, a PTT adapter for a two-way radio, or a two-way radio itself. In one example, an activation accessory for a controlled device includes a vibration motor, a wearable module including a Hall effect sensor, EMG sensor, and/or other sensor, and a communication element. The wearable module includes a sensor that is communicably coupled to a controller, which has a first output coupled to a control signal interface and a second output coupled to the vibration motor. The controller includes a processor and a memory coupled thereto and which stores processor-executable instructions that, when executed by the processor, cause the processor to receive and evaluate input signals from the sensor. In particular, the controller evaluates the input signals to determine whether or not they represent a command for the controlled device by assessing the input signals for a signal pattern indicative of a plurality of volitional actions of a wearer of the wearable module. If/when the processor determines that the input signals represent the command, then it decodes the command and transmits an associated control signal to the controlled device via the control signal interface. An optional activation signal may be transmitted to the vibration motor. On the other hand, if the processor determines that the input signals do not represent the command, no control signal or activation signal is transmitted and the processor proceeds to evaluate further/new input signals from the sensor in a like manner as the original input signals. The communication element is coupled to the control signal interface and is adapted to transmit the control signal from the processor to the controlled device. For example, the communication element may be a cable having a plug configured to mate with a jack at the controlled device, or a transmitter adapted for radio frequency communication with a receiver at the controlled device. Depending on the implementation, the activation signal for the vibration motor may be a pulse width modulated signal.

In various embodiments, the wearable module may be supported in a mount on a headband, or another arrangement. For example, such a mount may be moveable with respect to the headband so as to permit locating the wearable module at different positions on the wearer. More generally, such a mount may be configured to position the wearable module so as to be overlying an area of the wearer's temple (temporalis muscle), forehead, or other area/muscle. Alternatively, the wearable module may have an adhesive applied to a surface thereof to enable the wearable module to be worn on the face or head of the wearer. Such an adhesive may, in one case, be in the form of a removeable film adhered to the surface of the wearable module.

The wearable module may include more than one sensor, with the multiple sensors arranged with respect to one another so as to permit individual and/or group activation thereof by associated volitional actions of the wearer. Further, in addition to the vibrational motor, a visual activation indicator may be present. Such a visual activation indicator (e.g., an LED) may be coupled to receive a visual activation indication signal from the controller and the processor-executable instructions, when executed by the processor, may further cause the processor to transmit the visual activation indication signal to the visual activation indicator if/when the processor determines that the sensor input signals represent a command for the controlled device.

When assessing the input signals from the sensor for signal patterns indicative of a plurality of volitional actions of the wearer (that is, a command for a controlled device rather than noise due to incidental movement of the wearer), the processor may evaluate the input signals against a stored library of command signal representations, where each command signal representation characterizes an associated command for the controlled device. Alternatively, or in addition, the input signals may be assessed according to respective power spectral densities thereof within specified time periods. Or the input signals may be assessed according to count values of the sensor(s) received within a specified time period. Still further, the input signals may be evaluated against a trained model of command signal representations, where each command signal representation characterizes an associated command for the controlled device.

Systems and methods for hands-free operation of controlled devices, for example illumination systems, PTT systems, AR/VR systems, and other devices in accordance with embodiments of the invention are characterized, in part, by employing a switch element, e.g., a Hall effect sensor, EMG sensor, or similar senor that is positioned on or near the temple or forehead of a user, so that clenching/flexing of the jaw, movement of the eyebrow, or other facial movement activates the switch. In one embodiment, the switch element is employed in combination with a headlamp, PTT system, AR/VR system, or other controlled element. The headband positions the switch element so that it overlies an area of the wearer's temple (temporalis muscle), forehead, or other muscle so that clenching/flexing of the wearer's jaw, raising/lowering an eyebrow, or other volitional movement activates the switch, thereby allowing for hand-free operation of the controlled device. Other embodiments of the invention make use of the switch element as part of other head-worn illumination, imaging, and/or communication systems. In some instances, the switch element may be positioned in locations other than over the wearer's temple or forehead, allowing activation/deactivation by means of muscles associated with a wearer's eyebrow, etc.

As used herein, when referencing an area of a wearer's face overlying the temple, I mean that the wearable module or a wearable electronic controller has one or more active control surfaces (e.g., Hall effect sensors, electromyography (EMG) sensors, piezo switches, etc.) positioned to contact the right (and/or) left side of the wearer's face typically above and to the outside of the eyeline. However, it may also encompass the area of a wearer's forehead. The active control surfaces are configured to detect a relaxed condition and a flexed condition of the wearer's temple or forehead (see, e.g., FIG. 8), thereby allowing the wearer to generate input signals for controlling electronic system components via temple (temporalis muscle), eyebrow, etc. manipulation. The wearable module or a wearable electronic controller is adjustable in terms of the positioning of one or more of the active control surfaces within the area(s) overlying the temple or forehead and means for adjusting the contact pressure of the active control surfaces against the wearer's face (e.g., springs, hinges, etc.) may be provided. The wearable module may be constructed to house one or more of the electronic system components (e.g., lights, cameras, displays, laser pointers, a haptic engine in the form of a vibration motor, etc.) that is being controlled by temple, eyebrow, or other manipulation.

When the wearable module or a wearable electronic controller is worn so that, for example, an actuator thereof is positioned so as to overlie the wearer's temporalis muscle so as to be responsive to jaw clenches or other jaw movements of the wearer, hands free activation, deactivation, and/or operation of one or more controlled devices is possible. For example, to activate, deactivate, and/or operate a controlled device that is communicably coupled to the activation accessory, e.g., via the communication element, the wearer of the wearable device can perform one or more jaw clench actions. By clenching and unclenching his/her jaw, the wearer's temporalis muscle will be engaged and will expand and contract in the region of the wearer's temple. Because the actuator of the wearable module or a wearable electronic controller is positioned so as to overlie the wearer's temporalis muscle in the region of the wearer's temple, when the wearer's temporalis muscle expands and contracts in accordance with the wearer's jaw clench actions, the actuator, which presses on the skin of the wearer in the temple region, is moved. In one example, a jaw clench or movement causes the actuator to move laterally with respect to the wearer and a jaw unclenching or other movement causes the moveable actuator to move medially with respect to the wearer. Other motions of the actuator, such as rotations, may also be invoked through muscle movement. As described below, these movements of the moveable actuator are registered by a sensor associated with the wearable module or a wearable electronic controller and recognized as commands for the controlled device. Once so recognized, the commands are issued to the controlled device via the communication element. For the remainder of the discussion, jaw clenching and unclenching will be described, however, other movements of the jaw, for example lateral-medial movements, are contemplated for actuation of an actuator. Lateral-medial movements, clenching and unclenching, and other jaw movements that result in flexing and relaxing of a wearer's temporalis muscle are contemplated and are generally referred to herein as volitional movements. Similarly, for actuators positioned overlying other muscles of a wearer, a variety of volitional movements may be used to manipulate the actuator of a wearable module or a wearable electronic controller configured in accordance with the present invention.

In addition to this form of hands-free operation of the controlled device, the same wearable module or a wearable electronic controller can be used to activate, deactivate, and/or control the controlled device via touch actions of the wearer. For example, considering the same wearable module or a wearable electronic controller with an actuator positioned so as to overlie the wearer's temporalis muscle in the region of the wearer's temple as in the above example, the wearer may cause the wearable module or a wearable electronic controller to move with respect to its associated sensor by touching/pressing the wearable module or a wearable electronic controller instead of (or in addition to) by clenching/unclenching his/her jaw. If say the wearable module or a wearable electronic controller were eyewear and the actuator were positioned along one of the temple pieces of the eyewear so as to contact the wearer's skin in the region of the wearer's temple, then when the wearer pressed the temple piece of the eyewear towards his/her head (i.e., moved the temple piece medially towards his/her head), the actuator would move with respect to its sensor and cause the sensor to produce a signal just as if the actuator had moved responsive to a jaw clench. And, when the wearer released the temple piece of the eyewear and the temple piece of the eyewear moved laterally away from the wearer's head, the actuator would return to its original position with respect to the sensor, still touching the wearer's skin in the region of the wearer's temple, but now extended from the position it was in when the wearer was pressing on the temple piece. This touch/press responsiveness of the wearable module or a wearable electronic controller in addition to its responsiveness to hand-free actions of the wearer provides a very versatile set of operating characteristics for an activation accessory of a wearable device and a wide range of potential operating commands for controlled devices could be made up of successive hands-free/touch-press actions of a wearer.

As noted, in embodiments of the invention a sensor or multiple sensors of an activation accessory is/are responsive to movements of an actuator. One such sensor is a Hall effect sensor that is responsive to movements of a magnet (e.g., a magnet disposed in an actuator that is moveable with respect to the Hall effect sensor). Other sensors could be used and several examples are discussed below. The sensor is communicably coupled to a controller of the activation accessory (or another controller that is included in the wearable device), and the controller has an output coupled to a control signal interface. Generally, the controller may include a processor and a memory coupled to the processor, which memory stores processor-executable instructions that, when executed by the processor, cause the processor to perform various operations. For example, the stored processor-executable instructions, when executed by the processor, may cause the processor to receive, from the one or more sensors, input signals that are produced as outputs of the sensor(s) responsive to movements of the actuator. The instructions may cause the processor further to evaluate the input signals to determine whether or not the input signals represent a command for said controlled device. Since the activation accessory is part of or attached to a wearable device, it is conceivable that some motion of the actuator, and, hence, some signals output by the sensor(s) to the processor of the controller, may be associated with movements of the wearer and/or the wearable device that are not intended as movements representing commands for the controlled device. An example might be the wearer talking or eating. Such actions can be expected to cause the wearer's temporalis muscle to expand and contract, thereby causing an actuator positioned so as to be overlying the wearer's temporalis muscle in the region of the wearer's temple to move. This movement of the actuator would, in turn, cause the associated sensor(s) to produce output signals to the processor of the controller, but those signals should not cause the processor to issue commands to the controlled device because the wearer's movements were not intended to be interpreted as such commands. To address this situation and mitigate the effect of such movements of the wearer vis-à-vis commands issued to the controlled device, a filtering and/or analysis process may be used by the controller to distinguish volitional actions of the wearer that are intended as commands from those which are not.

Examples of the filtering and analysis process may include such things as band-pass filtering of the signals output by the sensor(s) so as to prevent high and/or low frequency signals, associated with high and/or low speed movements of the actuator, from being interpreted as signals associated with commands. Signals of a relatively high frequency may be regarded as being associated with rapid movements of the actuator, which may be indicative of movements of the wearer's jaw or other muscle(s) when engaged in activities not associated with issuing commands for a controlled device (e.g., eating, talking, etc.). Similarly, relatively low frequency signals may be regarded as being associated with relatively slow movements of the actuator, which may be indicative of movements of the wearer's jaw or other muscle(s) when engaged in activities not associated with issuing commands for a controlled device (e.g., stretching). By filtering out such relatively high and/or low frequency signals before they are provided to the processor of the controller for analysis (or by filtering of such relatively high and/or low frequency signals by the processor as a first step in any analysis), the present invention can avoid the issue of unintended commands to the controlled device.

Other actions in place of or in addition to this kind of filtering can be employed. For example, a microphone could be used in conjunction with the activation accessory (or as part thereof) and signals produced by the microphone when the wearer of the activation accessory is speaking provided to the processor. The stored processor-executable instructions, when executed by the processor, may be such that the processor, upon recognizing that the wearer is speaking, may ignore signals from the sensor(s) associated with the actuator as any such signals are likely to be the result of movement of the wearer's temporalis muscle (and, hence, the actuator) due to such speaking and not the result of the wearer issuing a command for the controlled device. Of course, the processor could be programmed so as to search for special signal patterns that indicate command sequences even when speaking is detected so that the activation accessory can be used to activate, deactivate, and/or control a controlled device even when the wearer is engaged in a conversation.

Further, and as discussed in greater detail below, the stored processor-executable instructions, when executed by the processor, may cause the processor to assess the input signals from the sensor(s) for one or more signal patterns indicative of a command for a controlled device, for example, by comparing time domain, frequency domain, or other representations of such signals to a stored library of command signal representations. By digitizing and then transforming received input signals from the sensor(s) using a Fast Fourier Transform algorithm or wavelet transform algorithm, for example, the processor may compare patterns of received input signals to stored replicas of known command clench and/or touch/press operations of the activation accessory and issue commands to the controlled device accordingly.

If the processor determines that the input signals from the sensor(s) represent a command for the controlled device, then the stored processor-executable instructions, when executed by the processor, may cause the processor to decode the command and, subsequently, transmit an associated control signal to the control signal interface. Otherwise, if the processor determines that the input signals from the sensor(s) do not represent a command for the controlled device, then the stored processor-executable instructions, when executed by the processor, will cause the processor to not transmit such a control signal and instead to proceed to evaluate further or new input signals from the sensor.

The communication element, which may be part of the activation accessory or another component of the wearable device, is coupled to the control signal interface and is adapted to transmit control signals from the processor to the controlled device. For example, the communication element may be a simple a cable having a plug configured to mate with a jack at the controlled device. Or the communication element may be a transmitter adapted for radio frequency communication with a receiver at the controlled device. Any of several kinds of radio frequency communications may be used, for example, Bluetooth, Bluetooth Low Energy (BLE), Zigbee, infrared, WiFi HaLow (IEEE 802.22h), Z-wave, Thread, SigFox, Dash7, or other form of radio frequency communication.

As noted, the activation accessory may be integrated into or attached to a wearable device such that when the wearable device is worn on a person the actuator of the activation accessory is touching the person at an area overlying the person's temporalis or other muscle. Such a wearable device may be a headband or a headset, in which case the actuator is preferably moveable with respect to a portion of the headband/headset, eyewear, in which case the moveable actuator may be supported in a temple piece or a frame of the eyewear, or other device, garment, module, or accessory, as described herein.

In further embodiments, the present invention provides a wearable sensor module configured to detect muscle movement of a wearer and to control an electronic device (e.g., an illumination element, AR/VR headset, etc.). In some cases, the electronic device may be a wearable device that incorporates or includes the wearable sensor module or to which the wearable sensor module is attached. In other cases, it may be a device remote from the wearable sensor module.

The wearable sensor module has a moveable control portion and a detection portion. The moveable control portion has a defined range of travel in relation to the detection portion between a fully extended position and a fully seated position. In some instances, the moveable control portion may be biased (e.g., by a spring, hinge, or other arrangement) so as to maintain its fully extended position until compressed towards its fully seated position by an outside force. When worn, the wearable sensor module contacts the wearer so that the moveable control portion partially compresses. This partial compression results in the detection portion producing an initial signal; for example, upon the wearer donning the wearable sensor module, the detection portion may produce the initial input signal as a result of movement (compression) of the moveable control portion when coming into contact with the wearer's body in a region overlying the wearer's temporalis muscle (e.g., at or near the wearer's temple). The initial signal may cause the wearable sensor module to wake from a sleep or inactive state so that subsequent movements of the moveable control portion caused by flexing and relaxing of the wearer's muscle(s) over which the sensor module is positioned cause the sensor to produce further signals that, when recognized by a controller of the wearable sensor module or the wearable device in which it is instantiated or to which it is attached, result in commands for controlling the electronic device to be generated.

The detection portion of the wearable sensor module is preferably configured to detect varying degrees of movement of the moveable control portion, which varying degrees of movement result in commands for controlling the electronic device to be generated. That is, it is recognized that the wearable device in which the wearable sensor module is instantiated or to which it is attached may be worn by different individuals, some or all of which may have heads of different shapes and sizes. So, the moveable control portion of the wearable sensor module may be actuated to different degrees by the different wearers. The detection portion is arranged and situated with respect to the moveable control portion so as to be responsive to these different degrees of actuation of the moveable control portion, e.g., different lengths of travel or movement thereof due to jaw clenching or other muscle movement.

As mentioned, when the moveable control portion is not experiencing any external forces acting upon it, it is biased open from the detection portion, e.g., by a hinge or layer of over-molded elastic polymer that provides spring-like bias. Then, when the moveable control portion contacts the wearer, e.g., being donned by the wearer, it is partially compressed along its length of travel with respect to the detection portion. This may happen, for example, when the moveable control portion contacts an area of the wearer's head or face overlaying the temporalis or other muscle.

The detection portion of the wearable sensor module may be removably attached or slidably attached to the wearable electronic device. Such configurations may allow for replacement of broken or damaged detection portions. Alternatively, the detection portion may be integrated as part of the wearable electronic device or of the wearable device to which the wearable electronic device is attached. And, as described above, input actuations of the moveable control portion may be generated both in a hand-free manner and/or manually by tapping or pressing the wearable electronic device to cause the moveable control portion to compress against or extend away from an area of the body over which the wearable sensor module is positioned. The wearable sensor module is thus configured to detect the movement of the moveable control portion as having been affected by tapping or pressing on the medial or lateral side of the wearable electronic device when the wearable electronic device is being worn.

In still further embodiments, the present invention provides a wearable sensor module configured to detect muscle movement and to control an electronic wearable device while attached thereto. The wearable sensor module has a moveable control portion, movement of which may be effected by a wearer of the electronic wearable device flexing and/or relaxing his/her temporalis and/or other muscle, and a detection portion, which may be attached to the wearable electronic device by an adjustable mounting interface. The moveable control portion has a defined range of travel in relation to the detection portion, between a fully extended position (in which the moveable control portion is biased when not acted upon by any external forces) and a fully seated position. Accordingly, the moveable control portion maintains its fully extended position with respect to the detection portion unless or until compressed towards its fully seated position by an outside force. When worn by a wearer, the wearable sensor module contacts the wearer so that the moveable control portion partially compresses, establishing an initial signal by the detection portion, for example upon the wearer donning the wearable sensor module. The initial signal and subsequent outputs of the detection portion being effected by movement of the moveable control portion caused by coming into contact with the person of the wearer and thereafter flexing and relaxing of muscles associated with volitional jaw movements of the wearer. The initial signal established as a result of partial compressing of the moveable control portion when the wearer dons the wearable sensor module is generated at a point at which the moveable control portion is positioned at location between its fully extended position and fully seated position so as to provide for subsequent adequate movement of the moveable control portion with respect to the detection portion in order to generate commands for a controlled device upon the position of the moveable control portion being affected by volitional jaw movements of the wearer.

Activation elements of wearable devices configured in accordance with embodiments of the present invention may be employed in combination with eyewear (e.g., eyeglasses, goggles, AR/VR headsets, etc.), headsets, masks, garments, accessories, or other head/face-worn articles used in a variety of contexts, including military, law enforcement, health care, and others (e.g., consumer). The head/face-worn article positions the moveable actuator of the activation element so that it overlies an area of the wearer's temporalis or other muscle so that clenching/flexing of the wearer's jaw moves the moveable actuator with respect to the sensor, thereby allowing for hand-free operation of the controlled device. Other embodiments of the invention make use of the moveable actuator as part of other head-worn articles, including but not limited to illumination, imaging, and/or communication systems. In some instances, the moveable actuator may be positioned in locations other than over the wearer's temporalis muscle, allowing activation/deactivation/operation of controlled devices by means of muscles associated with a wearer's eyebrow, jaw, or other body part.

As used herein, when referencing an area of a wearer's head or face overlying the temporalis muscle, it means that moveable actuator is positioned to contact the right or left side of the wearer's head or face within an area generally behind the eye and forward of the ear, near an area where the frontal, parietal, temporal, and sphenoid bones of the skull fuse. In other cases, for example where the moveable actuator is positioned by a headset or similar arrangement, it may be positioned above and perhaps forward of the wearer's ear. The moveable actuator is responsive to a relaxed condition and a flexed condition of the wearer's jaw, that is, it is moveable with respect to the sensor responsive to the user clenching and unclenching his/her jaw, thereby allowing the wearer to generate input signals for operating, activating, and/or deactivating controlled devices, such as electronic system components, via such clench actions. Note that while much of the discussion herein refers to actions of a wearer's jaw, such as clenching/unclenching, activation elements configured in accordance with embodiments of the present invention may be employed in connection with other volitional acts of a user moving his/her muscles. Also, while jaw clenches/unclenches are a preferred form of manipulation of a moveable actuator, hand/finger presses can also be used. For example, in the case of an activation element mounted on eyewear or a headset, a hand/finger press on the outside of the eyewear temple piece or earphone cup may cause the moveable actuator to move with respect to the sensor of the activation element, resulting in signals being provided from the sensor to the controller of the activation element for operation/activation/deactivation of the controlled device.

The support for the activation element may be adjustable in terms of the positioning of moveable actuator so that it overlies a portion of the wearer's temporal muscle. Further, the moveable actuator may be arranged so as to be at its fully extended position when the activation element is not being worn. For example, the moveable actuator may include a spring or hinge that is biased so as to be extended or open when the activation element is not being worn. Then, when a user dons the activation element, e.g., by putting on eyewear or a headset that includes the activation element, the moveable actuator may be partially compressed or moved, e.g., by contacting the wearer's head or face, to a semi-closed position between its fully extended position and fully compressed position. This movement of the activation element with respect to the sensor may cause the sensor to issue an output signal which the controller may interpret as a wake-from-sleep or similar command to begin sampling the sensor output for possible controlled device command signals.

Referring to FIG. 1, an example of an activation accessory 10 (which is an example of an accessory module 1000 shown in FIGS. 10-13) for a controlled device is shown. In some embodiments, the controlled device may be a wearable device in which the activation accessory is incorporated or attached to. In other cases, the controlled device may be remote from the activation accessory. The activation accessory 10 includes a vibration motor 12, a module 14 that includes a moveable actuator 8, a sensor (e.g., a Hall effect or other sensor) 16, and a controller 18. Sensor 16 is responsive to movements of the moveable actuator 8 (e.g., one or more magnets included in or on the moveable actuator 8) and is communicably coupled to controller 18 through an analog-to-digital converter 20, which converts the analog output of the sensor 16 to a digital signal that is provided as an input to a processor 22 of the controller. Processor 22, in turn, has outputs coupled to a control signal interface 24 and the vibration motor 12.

Examples of moveable actuators and sensors are further illustrated in FIGS. 3A-3D. In FIG. 10A, the moveable actuator 8 is a lever arm that is biased open with respect to sensor 16 by a spring 9 so as to be extended or open when the activation element is not being worn. When moveable actuator 8 is displaced so that magnet 5 is in the vicinity of sensor 16 (which may be a Hall effect sensor), sensor 16 produces an output signal. In FIG. 10B, the moveable actuator 8 is an over molded elastomer member that is supported on a pliable gasket or similar joint 11 and the sensor 16 is an optical sensor that produces an output signal responsive to movements of the moveable actuator 8 towards and/or away from the sensor. In FIG. 10C, the moveable actuator 8 is biased in an open position with respect to sensor 16 by one or more springs 13. When acted on by a force (e.g., a muscle movement due to a jaw clench or a touch/press), the moveable actuator 8 moves towards the sensor 16, causing the U-shaped leaf 15, which may be made of spring steel or another conductive material) to contact sensor 16, resulting in sensor 16 producing an output signal. The sensor 16 may be force-sensitive so that the magnitude of the output signal is responsive to the pressure exerted upon it by the U-shaped leaf 15; thus, an initial pressure due to a wearer donning the wearable module or a wearable device in which it is included or attached may cause the sensor 16 to output a signal of a magnitude indicative of a wake signal, while subsequent pressures due to jaw clench actions and/or touch/press actions of the wearer may cause the moveable actuator 8 to further compress the U-shaped leaf 15, resulting in greater pressure on sensor 16 and causing sensor 16 to output signals of a magnitude indicative of control inputs for the controlled device. FIG. 10D illustrates the moveable actuator 8 as a lever arm that is biased open with respect to sensor 16 by a living hinge 17 so as to be extended or open when the activation element is not being worn.

Figure 4:
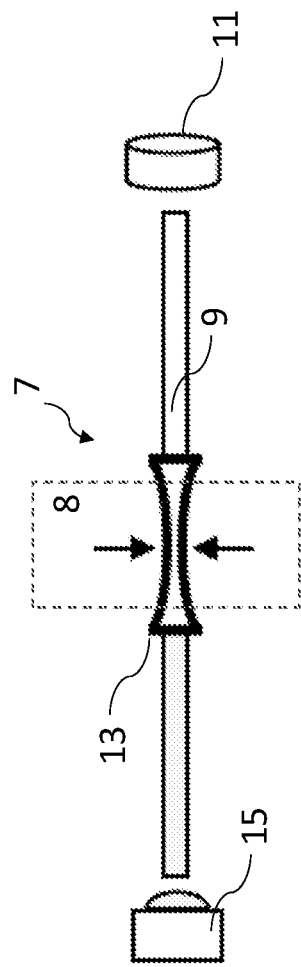
FIG. 4 illustrates an example of a fiber optic compression sensors for use with an activation accessory for a controlled device in accordance with an embodiment of the present invention.

As shown in FIG. 4, other sensors 16 that can be used include fiber optic compression sensors 7 in which the illuminance of photonically energized (e.g., by an LED 15) fiber optic cable 9 as detected by a photosensor 11 is varied according to the compression of a sleeve or other attenuator 13 surrounding or enclosing the fiber optic cable (e.g., by the action of a moveable actuator 8 responsive to jaw clench or other muscle movements of a wearer). Photosensor output is analyzed and processed as an input command for controlling electronic devices in the manner described herein. Such a sensor/controller arrangement is very lightweight and unobtrusive, requires no electronic components (and so is highly rugged/waterproof), features low-compute signal processing, provides variable input and is very low cost. The sensor's actuator can be placed away from the light source and photosensor expanding design flexibility. The sensor/controller could be positioned on eyewear and actuated by the temporalis muscle via jaw clenching to control electronic devices or positioned over other areas of the body to provide hands-free input by detecting movement. For example, one or more sensors could be attached to a glove and positioned over one or more knuckle bones in order to detect grasping/clenching. As the glove tightens over the knuckles while grasping/clenching, photonic output from the fiber optic cable would be reduced and detected by the photosensor, resulting in input commands being generated.

Returning to FIG. 1, the processor 22 of controller 18 is also coupled to a memory 26, which stores processor-executable instructions that, when executed by processor 22, cause processor 22 to receive and evaluate input signals from the sensor 16. Controller 18 (i.e., processor 22) evaluates the input signals to determine whether or not they represent a command for the controlled device by assessing the input signals for a signal pattern indicative of such a command. As more fully discussed below, if/when the processor 22 determines that the input signals from sensor 16 represent the command for the controlled device, then processor 22 decodes the command and transmits an associated control signal to the controlled device (not shown in this view) via the control signal interface 24, and optionally transmits an activation signal to the vibration motor 12. On the other hand, if the processor 22 determines that the input signals from sensor 16 do not represent the command for the controlled device, no control signal or activation signal is transmitted and processor 22 proceeds to evaluate further/new input signals from the sensor 16 in a like manner. In one embodiment, the activation signal for the vibration motor is a pulse width modulated signal. The haptic feedback provided by vibration motor 12 may also be activated by another user (e.g., through a communication to the wearer of activation accessory 10) to provide a means for silent communication.

In addition to the vibrational motor 12, a visual activation indicator 50 may be present. Such a visual activation indicator, e.g., one or more LEDs, may be coupled to receive a visual activation indication signal from the controller 18 (processor 22) and the processor-executable instructions stored in memory 26, when executed by processor 22, may further cause processor 22 to transmit the visual activation indication signal to the visual activation indicator 50 so as to illuminate the one or more LEDs for a brief period of time if/when the processor 22 determines that the input signals from the sensor 16 represent a command. The visual activation indicator 50 may be located on headwear on which the activation accessory 10 is attached or integrated into, or elsewhere. An activation indicator of this kind is especially useful when the activation accessory 10 is used to control devices such as PTT controllers/adapters associated with tactical radios or the radios themselves. When providing microphone actuation when using such radios, a "microphone status LED" may be included in visual activation indicator 50 to provide a visual awareness of microphone condition. An indicator light would be visible when the microphone is in use (i.e., open) and would be extinguished when the microphone is not in use (i.e., off).

Referring now to FIGS. 2A-2F, various examples of controlled devices and arrangements for communicatively coupling same to the activation accessory 10 are shown. As mentioned, the controlled device may be (or be a part of) a wearable device in which the activation accessory is incorporated or attached to. In FIG. 2A, the controlled device is an illumination element 30 made up of one or more LEDs 32. As indicated above, the processor of controller 18 is coupled to the control signal interface 24 and is adapted to transmit a control signal to the controlled device, in this case illumination element 30, via the control signal interface 24. Not shown in the illustration are drivers and other interface elements that may be present to amplify and/or otherwise condition the control signal so that it is suitable for use with the illumination element 30.

FIG. 2B illustrates an example in which the activation accessory 10 is coupled to a transmitter 34 via the control signal interface 24. Transmitter 34 may be a low power/short range transmitter, such as a Bluetooth™, Bluetooth Low Energy (BLE), Zigbee, infrared, WiFi HaLow (IEEE 802.22h), Z-wave, Thread, SigFox, Dash7, or other transmitter. The transmitter 34 may itself be the controlled device or, alternatively, as shown in FIG. 2D, the transmitter 34 may be one component of a wireless communication system that includes a receiver 36 communicatively coupled to a controlled device, such as two-way radio 38. In such an arrangement, transmitter 34 is adapted for radio frequency communication with receiver 36 at the controlled device. Thus, the control signal issued by processor 22 of controller 18 is coupled to the control signal interface 24 and transmitted via a radio frequency signal from transmitter 34 to the controlled device.

FIG. 2C shows a further alternative in which the activation accessory 10 is coupled directly to two-way radio 36. In this example, the control signal interface 24 may be coupled to the two-way radio 36 by a cable having a plug configured to mate with a jack at the two-way radio 36 (or, more generally, the controlled device). As such, the activation accessory 10 may function as a push-to-talk (PTT) unit for the two-way radio 36. Or, as shown in FIGS. 2E and 2F, the activation accessory 10 may function as an ancillary PTT element for a PTT adapter 40 for the two-way radio 36. The connection between the activation accessory 10 (control signal interface 24) and the PTT adapter 40 may be wired, as shown in FIG. 2E, e.g., using a cable having a plug configured to mate with a jack at the PTT adapter, or wireless, using a transmitter/receiver pair 34, 36. Of course, other arrangements for communicating the control signal produced by the processor 22 (or, more generally, controller 18) of the activation accessory 10 to a controlled device may be used.

In addition to the above-described examples, the processor 22 may also communicate with and control other peripherals, such as a heads-up display, audio input/output unit, off-headset unit, etc. Processor 22 is a hardware-implemented module and may be a general-purpose processor, or dedicated circuitry or logic, such as a field programmable gate array (FPGA) or an application-specific integrated circuit (ASIC)), or other form of processing unit. Memory 26 may be a readable/writeable memory, such as an electrically erasable programmable read-only memory, or other storage device.

As shown in FIG. 5, the module 14 may be a separately wearable component and may have an adhesive applied to a surface thereof to enable the wearable module 14 to be worn on the face or head of the wearer. Such an adhesive may, in one case, be in the form of a removeable film 54 adhered to the surface of the wearable module 14.

As shown in FIG. 6, the activation accessory 10 may be supported on a temple piece of eyewear 64. In particular, the activation accessory 10 can be adhered to the inside of eyewear temple piece 66 or slipped over a temple piece and held by screws, in each case so as to allow the moveable actuator to contact the wearer's temple area when the eyewear is worn. This also provides a convenient location for vibration motor 12. From this position on the user, when the processor of activation accessory 10 detects volitional movements of the wearer's temporal muscle and issues subsequent command signals, e.g., for activating, deactivating, or controlling a controlled device (e.g., changing the volume of audio communications or music, turning on integrated lighting modules, or answering a phone call), the vibration motor may be activated to provide feedback that indicates successful recognition of the input command. As discussed below, a distinct "clench language" may be programmed to control certain functions of the controlled device using specific temporalis muscle clench sequences or patterns. The vibration motor may also provide haptic feedback to the wearer as notification of microphone status or other enabled systems. For example, light vibrations of the vibration motor in a specific pattern may alert the wearer that a microphone is open, so as to prevent an "open-mic" situation where others are prevented from communicating over a common channel.

Further, additional sensors such as for wearer vital signs monitoring may also be integrated into the temple 66 to provide remote biomonitoring of the wearer, as the temple area has been proven to be an effective location for sensing certain vital signs. Such sensors may be integrated into the eyewear temples 66, permanently attached as an accessory, or attached to the inside of the temple using adhesive tape, glue, magnets, hook and loop fasteners, screws, or a tongue and groove or dovetail profile connection mechanism. The sensor signal may be routed through a powered cable/tether or via a wireless connection such as Bluetooth or Near Field Magnetic Induction. In other embodiments, one or more biomonitoring sensors 65 may be integrated onto/into a moveable actuator of the activation accessory 10, for example at a point of contact between the moveable actuator and the wearer's skin. FIG. 6 illustrates examples of such sensors.

Eyewear and other supporting articles for an activation accessory may further permit the use of two (or more) activation accessories by a wearer, for example, one positioned on the left side of the wearer's head or face and the other positioned on the right side of the wearer's head or face. By providing both a left and right activation accessory (or any number of them) which may be configured to allow for input of various command sequences (e.g., different numbers of activations similar to single-, double- or other mouse clicks), a wearer may provide different commands for an associated controlled device or multiple devices. For example, different command activation sequences may be used for zooming a camera, panning a direction in a virtual/visual environment, or a host of other commands to control cameras, audio transmissions (volume up or down), etc.

In addition to biomonitoring sensors gyros and/or accelerometers (and/or other sensors) may be included in the activation accessory. The use of gyros and/or accelerometers, etc., while clenching and holding can allow for selecting and moving objects in a virtual field. This is similar to a click-and-hold followed by movement of a cursor with a mouse or joystick in that it allows a user to move objects (e.g., icons) around on a virtual desktop, to open menus, and to select commands, etc. by clenching and moving one's head. The gyros and/or accelerometers may be incorporated in wearable module 14 or elsewhere (e.g., in a frame supporting the wearable module).

FIG. 7 illustrates an example of a wearable module 14' that includes two sensors 16-1, 16-2. Each sensor is associated with a respective paddle switch 56-1, 56-2, which can be depressed through a volitional action of the wearer. Depressing a paddle switch will cause its associated sensor to be activated.

In the various embodiments, activation accessory 10 is positioned so that the moveable actuator contacts the wearer's head or face, over the temporalis muscle so that clenching/flexing of the jaw activates the sensor 16. Power supply and control electronics for the activation accessory 10 may be incorporated within the activation accessory 10 itself, and/or in a frame, helmet, or other headwear that supports the activation accessory 10 or elsewhere.

In the various embodiments, the moveable actuator 8 may be hingibly attached to or within activation accessory 10, for example by a spring-loaded hinge that keeps the moveable actuator 8 against the wearer's head or face even when the wearer moves his/her head, unless moved away from the wearer's head/face by an amount sufficient to engage a detent that prevents return to a position adjacent a wearer's face unless manually adjusted by the wearer. Such a hingible arrangement may incorporate a spring-loaded hinge of any type, for example a spring-loaded piano hinge, butt hinge, barrel hinge, butterfly hinge, pivot hinge, or other arrangement. Other embodiments include the use of a living hinge or an elastic/memory effect produced by wholly or partially encapsulating the moveable actuator in an over-molded elastic polymer which produces a stretchable membrane effect, and which also provides water resistance.

As should be apparent from the above discussion, use of the activation accessory does not require donning a headset or mask. Instead, the activation accessory can be worn by itself, e.g., through use of an adhesive. Incorporating the activation accessory in headsets would typically be the norm for any member of an aircraft flight or operations crew, but headsets such as the one illustrated in the above-referenced figures are not restricted to use by flight/aircraft crews and may be employed by ground forces, naval/coast guard personnel, and civilians. For example, headsets such as the ones described herein may be employed by workers in and around constructions sites, sports arenas, film and television production locations, amusement parks, and many other locations. By employing headgear equipped with activation accessories such as those described herein, wearers thereof have ready access to activation/deactivation/operation of illumination, imaging, gaming, and/or communications system(s)) in a hands-free fashion.

When assessing the input signals from the sensor(s) 16 for a signal pattern indicative of a command, the processor 22 may evaluate the input signals against a stored library of command signal representations, where each command signal representation characterizes an associated command for the controlled device. Alternatively, or in addition, the input signals may be assessed according to respective power spectral densities thereof within specified time periods. Or the input signals may be assessed according to count values of the sensor(s) received within a specified time period. Still further, the input signals may be evaluated against a trained model of command signal representations, where each command signal representation characterizes an associated command for the controlled device.

Figure 8:
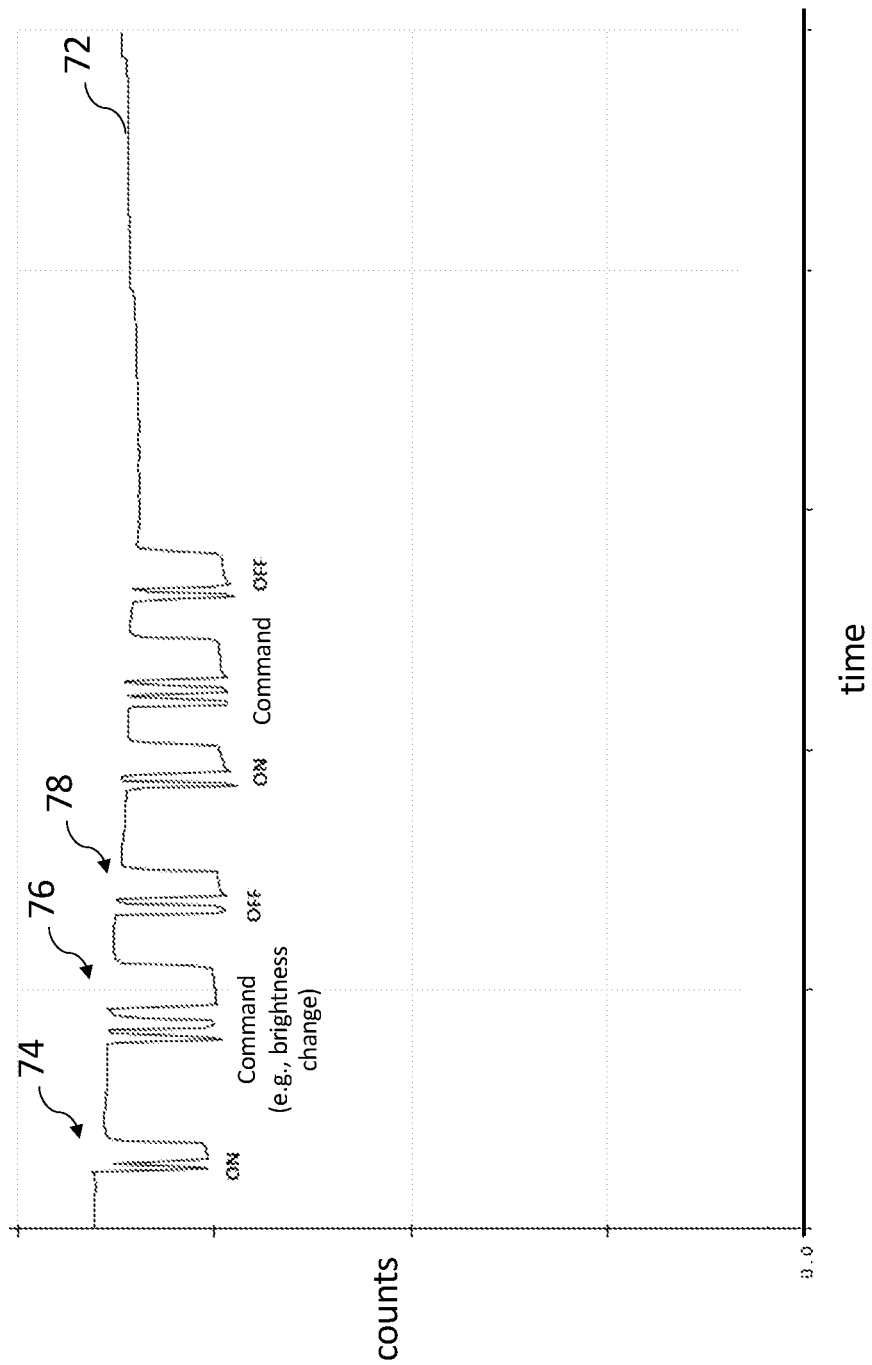
FIG. 8 illustrates an example of an input signal received by a processor of a wearable module from sensor of the wearable module in accordance with embodiments of the present invention.

An example of an input signal received by processor 22 from a Hall effect sensor 16 is illustrated in FIG. 8. Trace 72 depicts "counts" of the Hall effect sensor 16 received by processor 22 over time. In this context, the counts, represent the applied magnetic field detected by the Hall effect sensor 16 which varies with the movement of the moveable actuator 8 in response to jaw clench actions of the wearer. Other output parameters that can be measured to provide similar results include voltage and/or current. More generally, in embodiments of the present invention the activation accessory 10 includes one or more switch elements (Hall effect sensor(s) 16 or other(s) of the sensors discussed herein) that is/are sensitive to movements of a wearer's temporalis muscle and which are communicatively coupled to controller 18 having processor 22 and memory 26 coupled thereto and storing processor-executable instructions. Processor 22 is further coupled to provide an output signal to an indicator, such as illumination element 50 and/or vibration motor 12. The activation accessory 10 may be fitted to a head- or face-worn article (e.g., a garment, headset, mask, or eyewear, as described herein) so as to be capable of being positioned to allow the moveable actuator(s) with the one or more switch elements to contact a side of the wearer's head or face. The processor-executable instructions stored in memory 26, when executed by processor 22, cause the processor to receive input signals from the one or more sensors, detect relaxed (signal level high in FIG. 9) and clenched (signal level low) conditions (e.g., by level or edge detection of the input signals) of the wearer's jaw. From these input signals, processor 22 decodes the relaxed and clenched conditions as commands (74, 76, 78, etc.) for controlling electronic system components communicatively coupled to the controller and alerts the wearer to successful decoding of the commands by providing the output signal to the indicator.

As illustrated in FIG. 8, trace 72 exhibits marked shifts in count values corresponding to periods of time when a wearer relaxes (signal level high) and clenches (signal level low) his/her jaw while wearing activation accessory 10. The detection of such actions by processor 22 may be edge-sensitive or level-sensitive. Further, as indicated above, the Hall effect sensor signals may be decoded according to a clench language to discriminate between activation, deactivation, and operational commands for the controlled device. The example shown in FIG. 8 represents decoded signals representing commands for an illumination unit. Signal groups 74 and 78, a short clench followed by a long clench, represent activation ("on") and deactivation ("off") commands. That is, the illumination module is ordered to change operating state, from a current state on or off to an opposite state off or on, respectively, when such a set of input signals is recognized by the processor 22. Signal group 76 represents a command to alter an output characteristic, e.g., brightness, and corresponds to two short clenches followed by a long clench. The two short clenches signal a change in output and the long clench signals that the brightness of the illumination unit should be varied, e.g., low to high, during the period of the clench action. Of course, other clench languages for a variety of controlled devices may be implemented. For example, in addition to double clench inputs signaling a following command input, triple clench inputs may be recognized as signally valid command inputs, different from commands associated with a double clench input. Further multiple clench inputs and/or clench-and-hold inputs may also be recognized as signifying different commands. Such multi-clench inputs are useful for eliminating unintentional actuations of Hall effect sensor 16, as may be occasioned by involuntary muscle movements or by a wearer chewing food, gum, etc., or clenching his/her jaw during other activities. Generally, the intended command may be identified by decoding the detected relaxed and clenched conditions of the wearer's jaw according to a clench language that identifies such commands according to a number of detected clench actions identified within a time period, for example, a number of detected short and long (clench-and-hold) clench actions identified within a time period. Valid forms of clench inputs may be used to turn on/off lighting elements and/or individual LEDs thereof, adjust the intensity of one or more illuminated LEDs, or to signal other desired operations. In general, clench input actuation sequence timings, repetitions, and durations may each be used, individually and/or in combination to specify different command inputs for one or more controlled devices.

Figure 9:
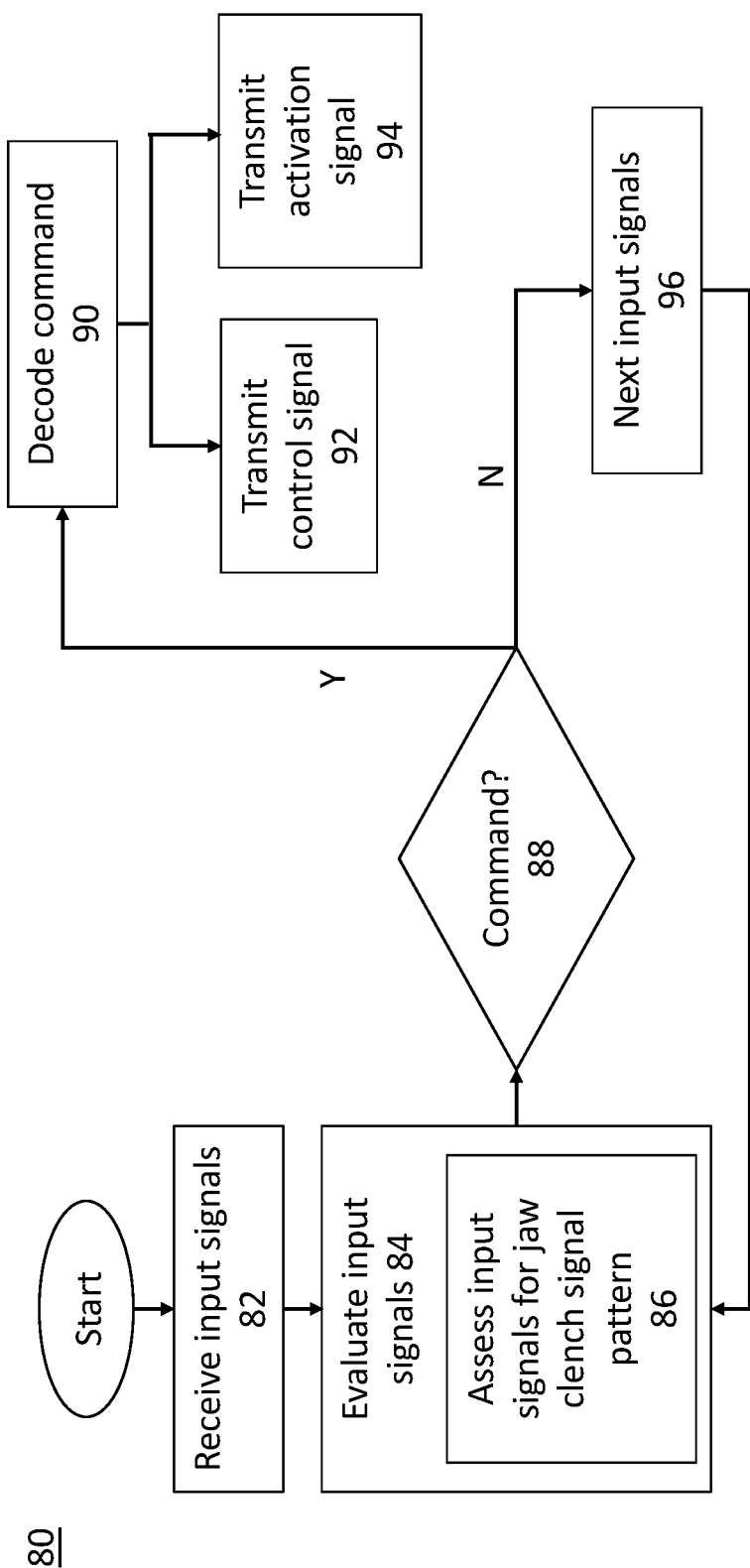
FIG. 9 illustrates a method of operating a controlled device in a hands-free manner through volitional jaw clench actions of a wearer in accordance with an embodiment of the invention.

FIG. 9 illustrates a method 80 of operating a controlled device in accordance with embodiments of the present invention. At 82, the controller 18 receives from the Hall effect sensor 16 in the wearable module 14 first input signals. At 84, processor 22 of controller 18 evaluates the first input signals according to and by executing processor-executable instructions stored in memory 26 to determine whether or not the first input signals represent a command for the controlled device. As discussed above, this evaluation 84 proceeds by the processor assessing 86 the first input signals for a signal pattern indicative of a plurality of volitional jaw clench actions of a wearer of the activation accessory 10. If processor 22 determines that the first input signals represent the command, step 88, then processor 22 decodes the command 90, e.g., by identifying the input signals as being one of a number of patterns of a clench language, as described above, and transmitting 92 an associated control signal to the controlled device via a communication element communicably coupled to the processor, and, optionally, transmitting 94 an activation signal to a vibration motor of the wearable module. As indicated above, the communication element may be a cable having a plug configured to mate with a jack at the controlled device, a transmitter adapted for radio frequency communication with a receiver at the controlled device, or other element. Decoding the command signal may involve determining the number of short clench actions preceding a long clench action to determine the nature of a following one or more long and/or short clench actions, and may also depend on a current operating state of the controlled device. Otherwise, step 96, the processor 22 does not transmit the control signal and the activation signal and instead proceeds to evaluate second/next input signals 96 from the Hall effect sensor in a like manner as the first input signals.

In general, sensor 16 is a device that requires little or no mechanical displacement of a control element associated with moveable actuator 8 in order to signal or effect a change (or desired change) in state of a controlled system. In various examples above, sensors such as a Hall effect sensor, an optical sensor, a contact sensor, a force-sensitive sensor, and a fiber optic compression sensor have been highlighted. Other sensors 16 which may be employed in accordance with the present invention include an EMG sensor or a piezo switch, such as the Piezo Proximity Sensor produced by Communicate AT Pty Ltd. of Dee Why, Australia. Piezo switches generally have an on/off output state responsive to electrical pulses generated by a piezoelectric element. The electrical pulse is produced when the piezoelectric element is placed under stress, for example as a result of compressive forces resulting from movement of a moveable actuator 8 responsive to a wearer clenching his/her jaw so that pressure is exerted against the piezoelectric element. Although the pulse is produced only when the compressive force is present (e.g., when the wearer's jaw is clenched), additional circuitry may be provided so that the output state of the switch is maintained in either an "on" or an "off" state until a second actuation of the switch occurs. For example, a flip-flop may be used to maintain a switch output logic high or logic low, with state changes occurring as a result of sequential input pulses from the piezoelectric element. One advantage of such a piezo switch is that there are no moving parts (other than a front plate that must deform by a few micrometers each time a wearer's jaw is clenched) and the entire switch can be sealed against the environment, making it especially useful for marine and/or outdoor applications.

Another example of a sensor 16 is a micro tactile switch. Although tactile switches employ mechanical elements subject to wear, for some applications they may be more appropriate than Hall effect sensors or piezo switches because they provide mechanical feedback to the user (although the haptic feedback provided by vibration motor 12 also provides an acceptable level of feedback for a user and so may be sufficient in the majority of instances). This feedback can provide assurance that the switch has been activated or deactivated. Momentary contact tactile switches may also be used, but because they require continual force (e.g., as provided by clenching one's jaw against the switch), they are best suited to applications where only a momentary or short engagement of the active element under the control of switch is desired, for example, signal light flashes, burst transmissions, or other short duration applications, or where a flip flop is used to maintain an output state until a subsequent input is received, as discussed above. Other forms of switches include a ribbon switch (e.g., as made by Tapeswitch Corporation of Farmingdale, NY) and conductive printed circuit board surface elements activated via carbon pucks on an overlaid keypad.

As discussed above, in various embodiments the controlled device may consist of one or more LEDs, which emit light in one or more wavelengths. Examples of such LEDs may be the headlamp 1400 shown in FIGS. 10, 11, and 11A or headlight 1600 shown in FIG. 12. In FIG. 10, the activation accessory is included in an accessory module 1000 that can be attached to an elastic or other (e.g., rigid) headband 1200 used to secure the headlamp. FIG. 11B shows this headband arrangement unworn. In FIG. 11A, the activation accessory is included in the accessory module 1000, which also includes the headlamp. In FIG. 13, the controlled device consists of an AR/VR headset 1800.

In still further embodiments the controlled device may include one or more cameras for digital still and/or video imaging. In some instances, a lighting element may be worn on one side of the headset while an imaging system is worn on the opposite side, each being controlled by separate activation accessories mounted on respective opposite sides of the headset, or by activation accessory if the lighting and illumination systems are responsive to different command signals, similar to the way in which computer cursor control devices (e.g., touch pads, mice, etc.) may be separately responsive to single, double, triple, or other multiple clicks. Indeed, the activation accessory may itself be used to control a cursor as part of a user-computer interface. For example, any or all of cursor type, cursor movement, and cursor selection may be controlled using an activation accessory 10 positioned so that the moveable actuator is flush against the wearer's face (or nearly so), over the area of the temporalis muscle so that clenching/flexing of the jaw activates the sensor 16 or other sensor. Applications for such uses include computer gaming interfaces, which today commonly include head-worn communication equipment. One or more activation accessories 10 configured in accordance with embodiments of the invention may be fitted to such headgear (either when manufactured or as an after-market addition) to provide cursor control capabilities. Conventional wired or wireless communication means may be employed to provide a connection to a console, personal computer, tablet, mobile phone, or other device that serves as the gaming or other host. The use of such human-machine interfaces may find particular application for users that have no or limited use of their hands and afford them a convenient means of interacting with a personal computer, tablet, mobile phone, or similar device.

Further, the controlled device(s) may include one or more microphones. Such microphones may be mounted or integral to a headset and make use of bone conduction transducers for transmission of audio signals. Alternatively, or in addition, activation accessory 10 may be used to adjust the presence, absence, and/or volume of audio played through one or more earphones or other earpieces. Also, activation accessory 10 may be used to control off-headset equipment, for example, via a wireless transmitter.

One or more of the above-described embodiments may permit signal generation via a control surface that can be activated by direct or indirect force, hinged paddle, touch-sensitive surface, or other tactile actuation device. Devices configured in accordance with these embodiments may employ moveable structures (e.g., paddles) that house Hall effect sensors to detect a change in an electromagnetic field when a corresponding magnet is moved in proximity to the sensor. Such devices may be in the form of an accessory to a remote (e.g., hand-held) device or fully integrated into a wearable form factor such as eyewear and headsets. Other sensors, as discussed herein, may also be used.

By providing both a left and right activation means (or any number of them) which may be configured to allow for input of various command sequences (e.g., different numbers of activations similar to single-, double- or other mouse clicks), a user may provide different commands for an associated device. For example, different command activation sequences may be used for zooming a camera, panning a direction in a virtual/visual environment, or a host of other commands to control cameras, audio transmissions (volume up or down), etc.

Thus, systems and methods for operating a controlled device in a hands-free or other manner through volitional jaw clench actions of a wearer, and in particular using an activation accessory for a controlled device that includes a moveable actuator, sensor (e.g., a Hall effect or other sensor), and a communication element have been described. In various embodiments, the present invention improves the functionality of controllable electronic devices by providing improved hands-free and tactile input and control methods that cater to both fully abled and disabled users, Moreover, because the moveable actuator of the activation accessory has a range of travel between its fully extended position and fully compressed position, when worn on temple pieces of eyewear and the like the activation accessory accommodates a wide variety of wearers, e.g., those with wide or thin faces, those with or without facial hair, etc. The position of the moveable actuator when the activation accessory, or an instrumentality in which it is positioned/included, is donned may contribute to an initial output signal of the sensor, but this initial signal can be taken as a baseline value and accommodated when analyzing the output signal of the sensor for commands. The baseline value may be continually or periodically adjusted by sampling the output of the sensor so as to accommodate movements of the activation accessory (e.g., the moveable actuator) that are not intended command inputs. Beyond jaw clenching, an input signal can be produced manually by tapping or pressing the activation accessory or an instrumentality in which it is positioned/included at a location that causes the moveable actuator to first be compressed then extended, or conversely, for it to first be extended then compressed. The sensor can detect if the tapping or pressing is generated from the right or left side of a head-worn device depending on whether it first detects compression or extension of the moveable actuator surface when tapping/pressing force is applied. The moveable actuator allows for varying levels of input by detecting movement (e.g., travel, speed, duration, etc.) of the moveable actuator caused by clenching, tapping, or pressing, from very light to very hard. While described with reference to eyewear and similar articles, the activation accessory may be worn on/with other wearables that feature a flexible or rigid band (e.g., AR/VR headsets), the inside surface of which defines a plane alongside the wearer's face/head or other wearable bands that define other planes when worn on other parts of the body (e.g., wristbands, etc.). Any such wearable will permit the moveable actuator to be moved with respect to the sensor, allowing the sensor to output signals responsive to the wearer moving/flexing associated muscles.

What is claimed is:

1. A system, comprising:
   eyewear having mounted thereon a module that includes an actuator that is moveable with respect to a temple piece, headband, or frame of the eyewear, the module configured to produce output signals responsive to movements of the actuator;
   a controller coupled to receive the output signals from the module and including a processor and a memory coupled to the processor, the memory storing processor-executable instructions that, when executed by the processor, cause the processor to receive and evaluate the output signals of the module to determine whether or not the output signals of the module represent a command for a controlled device by assessing the output signals of the module for a signal pattern indicative of one or more volitional actions of a wearer of the eyewear, and when the processor determines that the output signals of the module represent the command for the controlled device, then decoding the command for the controlled device and transmitting a control signal for the controlled device, otherwise if the processor determines that the output signals of the sensor do not represent the command, then not transmitting the control signal and proceeding to evaluate further output signals of the module.

2. The system of claim 1, wherein the actuator is positionable on the eyewear so as to be adjacent the wearer overlying an area of the wearer's temporalis muscle, or a tendon which inserts onto a coronoid process of a mandible of the wearer, or the wearer's masseter muscle.

3. The system of claim 1, wherein the actuator is biased so as to touch skin of the wearer overlying an area of the wearer's temporalis muscle, or a tendon which inserts onto a coronoid process of a mandible of the wearer, or the wearer's masseter muscle.

4. The system of claim 1, wherein the actuator has a defined range of travel and is biased so as to maintain a fully extended position until compressed towards a fully seated position when the eyewear is worn by the wearer.

5. The system of claim 1, wherein the actuator is biased so as to be partly compressed when the eyewear is worn by the wearer.

6. The system of claim 5, wherein the processor-executable instructions, when executed by the processor, further cause the controller to wake from an inactive state in response to a signal from the sensor that is produced in response to partial compression of the actuator.

7. The system of claim 1, wherein the processor-executable instructions, when executed by the processor, further cause the processor to evaluate the output signals from the module by evaluating the output signals against a stored library of command signal representations, where each command signal representation of the stored library of command signal representations characterizes an associated command for the controlled device.

8. The system of claim 1, wherein the processor-executable instructions, when executed by the processor, further cause the processor to evaluate the output signals from the module according to power spectral densities output signals from the sensor within specified time periods.

9. The system of claim 1, wherein the processor-executable instructions, when executed by the processor, further cause the processor to evaluate the output signals from the module according to count values of the sensor received within a specified time period.

10. The system of claim 1, wherein the processor-executable instructions, when executed by the processor, further cause the processor to evaluate the output signals from the module against a trained model of command signal representations, where each command signal representation of the model characterizes an associated command for the controlled device.

* * * * *